US012041342B2

(12) United States Patent
Fujisaki

(10) Patent No.: US 12,041,342 B2
(45) Date of Patent: Jul. 16, 2024

(54) IMAGE CAPTURE APPARATUS AND CONTROL METHOD

(71) Applicant: CANON KABUSHIKI KAISHA, Tokyo (JP)

(72) Inventor: Tsuyoshi Fujisaki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 79 days.

(21) Appl. No.: 17/934,236

(22) Filed: Sep. 22, 2022

(65) Prior Publication Data

US 2023/0100678 A1 Mar. 30, 2023

(30) Foreign Application Priority Data

Sep. 27, 2021 (JP) ................................. 2021-157234
Aug. 17, 2022 (JP) ................................. 2022-130124

(51) Int. Cl.
*H04N 23/65* (2023.01)
(52) U.S. Cl.
CPC .................................. *H04N 23/65* (2023.01)
(58) Field of Classification Search
CPC ....... H04N 23/65; H04N 23/633; H04N 23/74
See application file for complete search history.

(56) References Cited

U.S. PATENT DOCUMENTS

| 2010/0148580 | A1* | 6/2010 | Taniuchi | ................. | H02J 1/102 |
| | | | | | 307/29 |
| 2014/0354870 | A1* | 12/2014 | Horie | .................... | G06F 1/3206 |
| | | | | | 345/522 |
| 2020/0084378 | A1* | 3/2020 | Kawamoto | ............ | H04N 23/65 |
| 2020/0304711 | A1* | 9/2020 | Suzuki | .................. | H04N 23/51 |
| 2022/0153285 | A1* | 5/2022 | Ide | ..................... | B60R 16/0232 |
| 2023/0163626 | A1* | 5/2023 | Chen | .................... | H02J 7/0047 |
| | | | | | 307/66 |

FOREIGN PATENT DOCUMENTS

JP 2017-127112 A 7/2017

* cited by examiner

*Primary Examiner* — Michael Lee
(74) *Attorney, Agent, or Firm* — Cowan, Liebowitz & Latman, P.C.

(57) ABSTRACT

An image capture apparatus comprises a first load, a second load and a power receiving circuitry that receives power from a second power supply which is different from a first power supply, and performs control so as to supply power from the first power supply to the first load and the second load, and controls such that when the power receiving circuitry is capable of receiving power that is greater than the power from the first power supply from the second power supply, the power from the first power supply is supplied to the first load, and the power from the second power supply which is greater than the power from the first power supply is supplied to the second load.

9 Claims, 16 Drawing Sheets

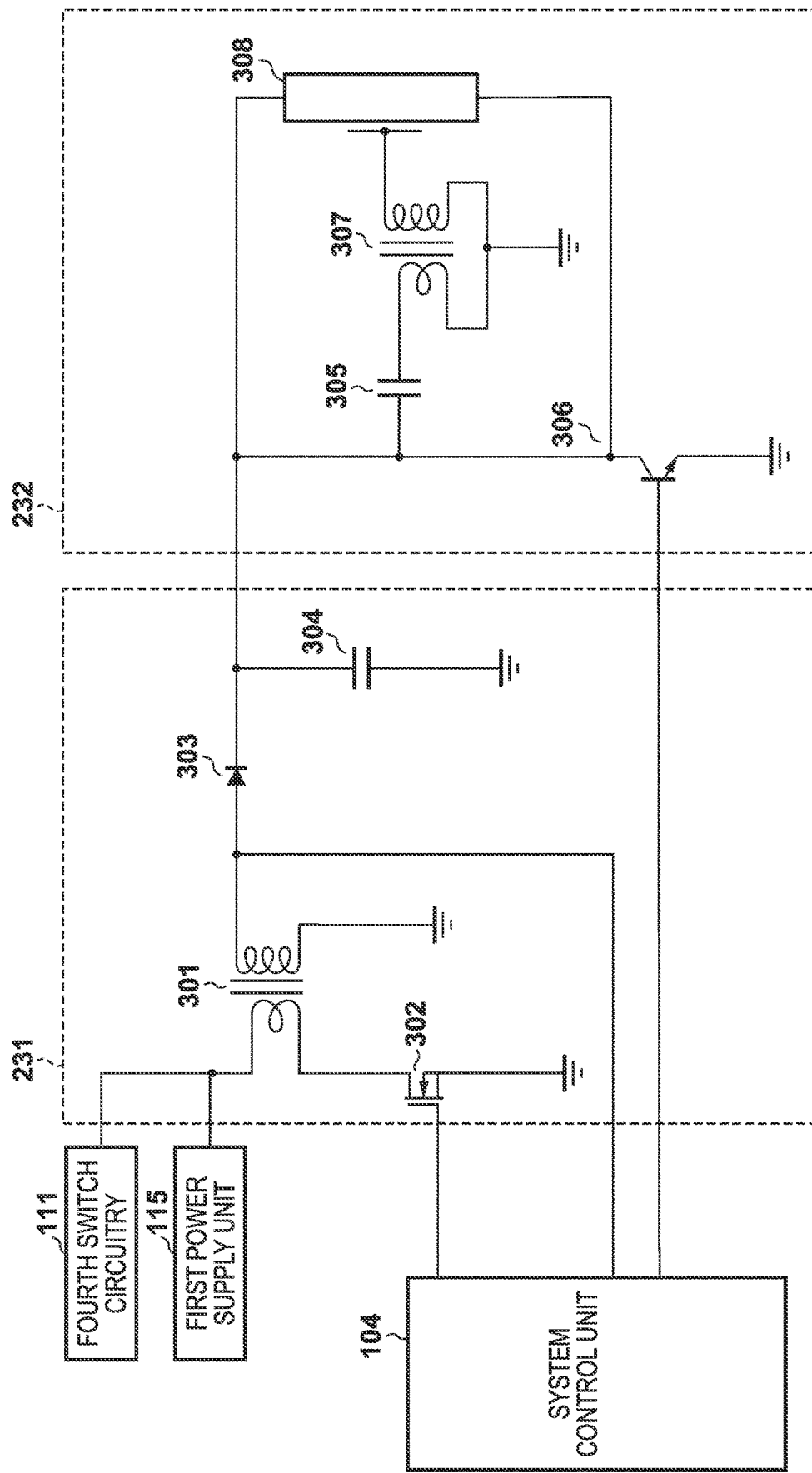

F I G. 5

| POWER SOURCE | FIRST CHARGE MODE | | SECOND CHARGE MODE | |
|---|---|---|---|---|
| | VOLTAGE | CURRENT | VOLTAGE | CURRENT |
| POWER SUPPLY DEVICE | NOT LESS THAN BATTERY VOLTAGE (≥ 8.4V) | NOT LESS THAN BATTERY CURRENT | NOT MORE THAN BATTERY VOLTAGE | NOT MORE THAN BATTERY CURRENT |

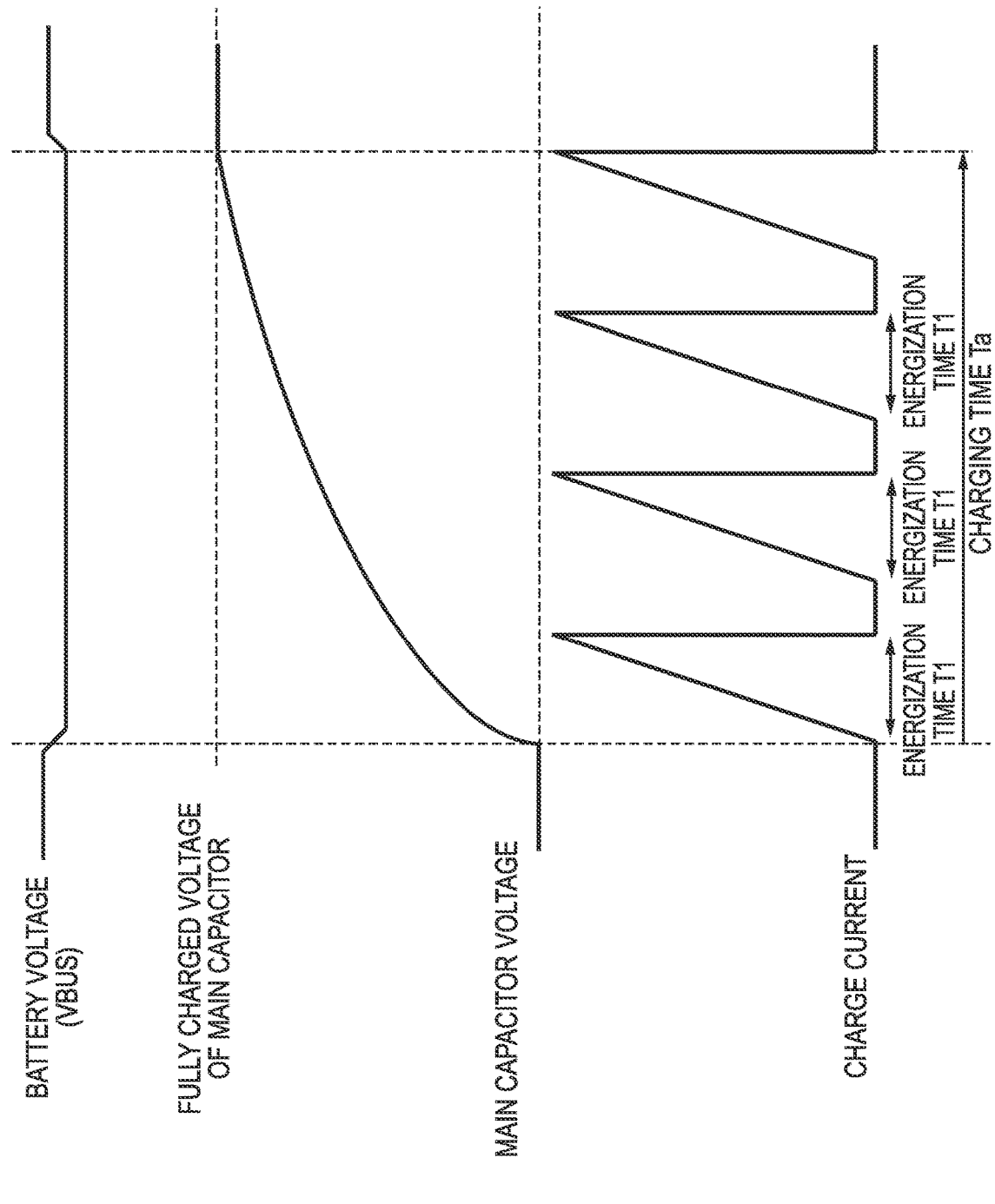

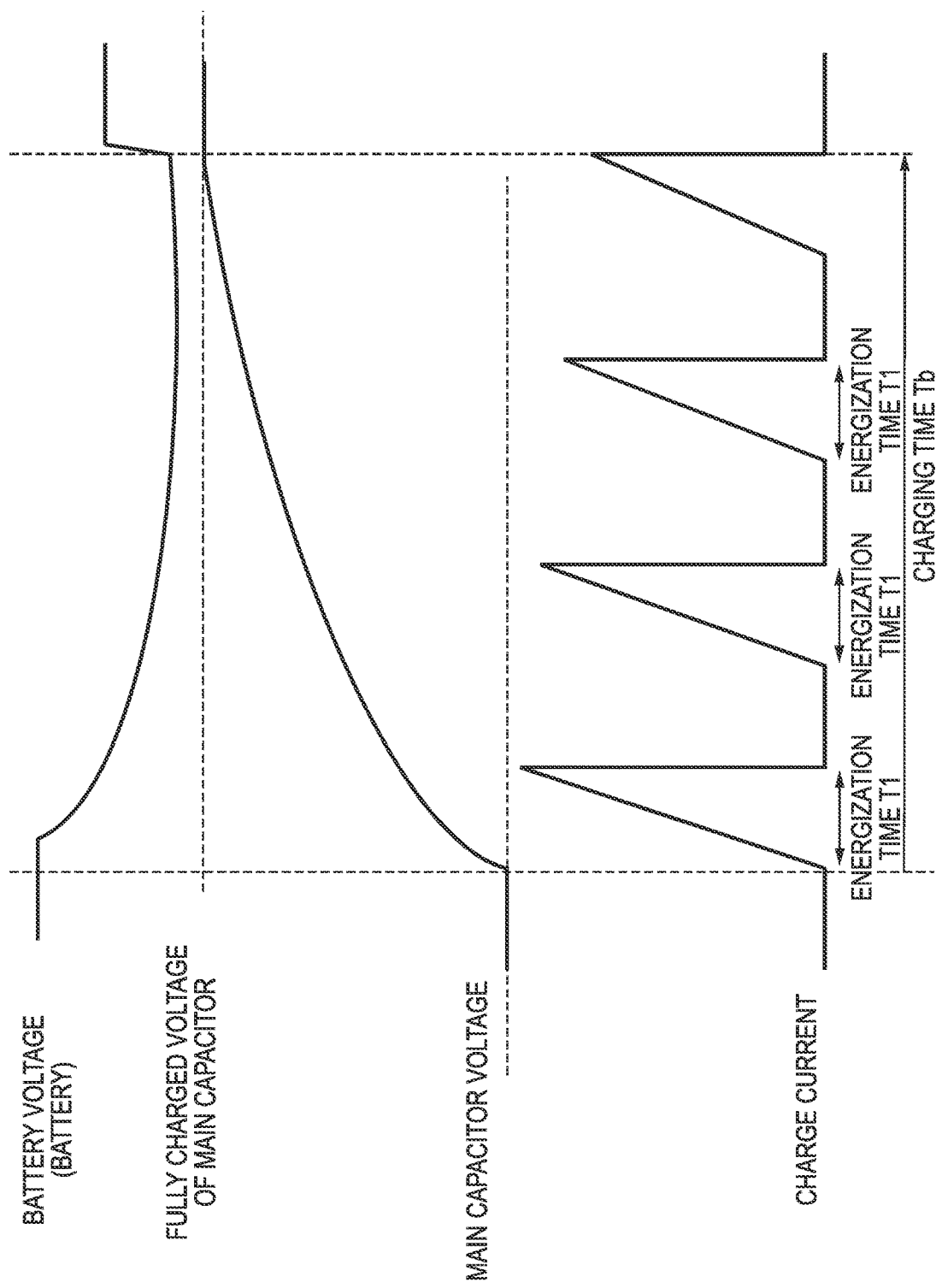

IMAGE CAPTURE APPARATUS AND CONTROL METHOD

BACKGROUND OF THE INVENTION

Field of the Invention

The present invention relates to an image capture apparatus and a method of controlling the image capture apparatus.

Description of the Related Art

Japanese Patent Laid open No. 2017-127112 discloses a method of supplying power of a sub power supply for a high priority load when an output power of a main power supply decreases.

The method described in Japanese Patent Laid open No. 2017-127112 can keep the power supply to the high priority load from being interrupted, but does not control the power supply so as to improve performance of an image capture apparatus.

SUMMARY OF THE INVENTION

The present invention has been made in consideration of the aforementioned problems, and realizes techniques that can contribute to the improvement of the performance of the image capture apparatus.

In order to solve the aforementioned problems, the present invention provides an image capture apparatus comprising: a first load; a second load; a power receiving circuitry that receives power from a second power supply which is different from a first power supply; a CPU; and a memory storing a program which, when executed by the CPU, causes the CPU to function as the following unit: a control unit that performs control so as to supply power from the first power supply to the first load and the second load, wherein the control unit controls such that when the power receiving circuitry is capable of receiving power that is greater than the power from the first power supply from the second power supply, the power from the first power supply is supplied to the first load, and the power from the second power supply which is greater than the power from the first power supply is supplied to the second load.

In order to solve the aforementioned problems, the present invention provides a method of controlling an image capture apparatus having a first load and a second load, the method comprising: supplying power from a first power supply to the first load and the second load; receiving power from a second power supply which is different from the first power supply; controlling such that when the receiving is capable of receiving power that is greater than the power from the first power supply from a second power supply, the power from the first power supply is supplied to the first load, and the power from the second power supply which is greater than the power from the first power supply is supplied to the second load.

In order to solve the aforementioned problems, the present invention provides a non-transitory computer-readable storage medium storing a program which causes an image capture apparatus having a first load, a second load and a power receiving circuitry that receives power from a second power supply which is different from a first power supply and a CPU to execute the following method, the method comprising: performing control so as to supply power from the first power supply to the first load and the second load, wherein in the control, when the power receiving circuitry is capable of receiving power that is greater than the power from the first power supply from the second power supply, the power from the first power supply is supplied to the first load, and the power from the second power supply which is greater than the power from the first power supply is supplied to the second load.

The present invention can contribute to the improvement of the performance of the image capture apparatus Further features of the present invention will become apparent from the following description of exemplary embodiments (with reference to the attached drawings).

BRIEF DESCRIPTION OF THE DRAWINGS

FIG. 3 is a diagram illustrating circuitry of flash charge unit 231 and flash light emission control unit 232 of the image capture apparatus 100 according to the first embodiment.

FIG. 5 is a diagram illustrating an example of a determination condition of a flash charge mode of the image capture apparatus 100 according to the first embodiment.

FIGS. 6A and 6B are diagrams illustrating examples of operations in the flash charge mode of the image capture apparatus 100 according to the first embodiment.

DESCRIPTION OF THE EMBODIMENTS

Figure 1:
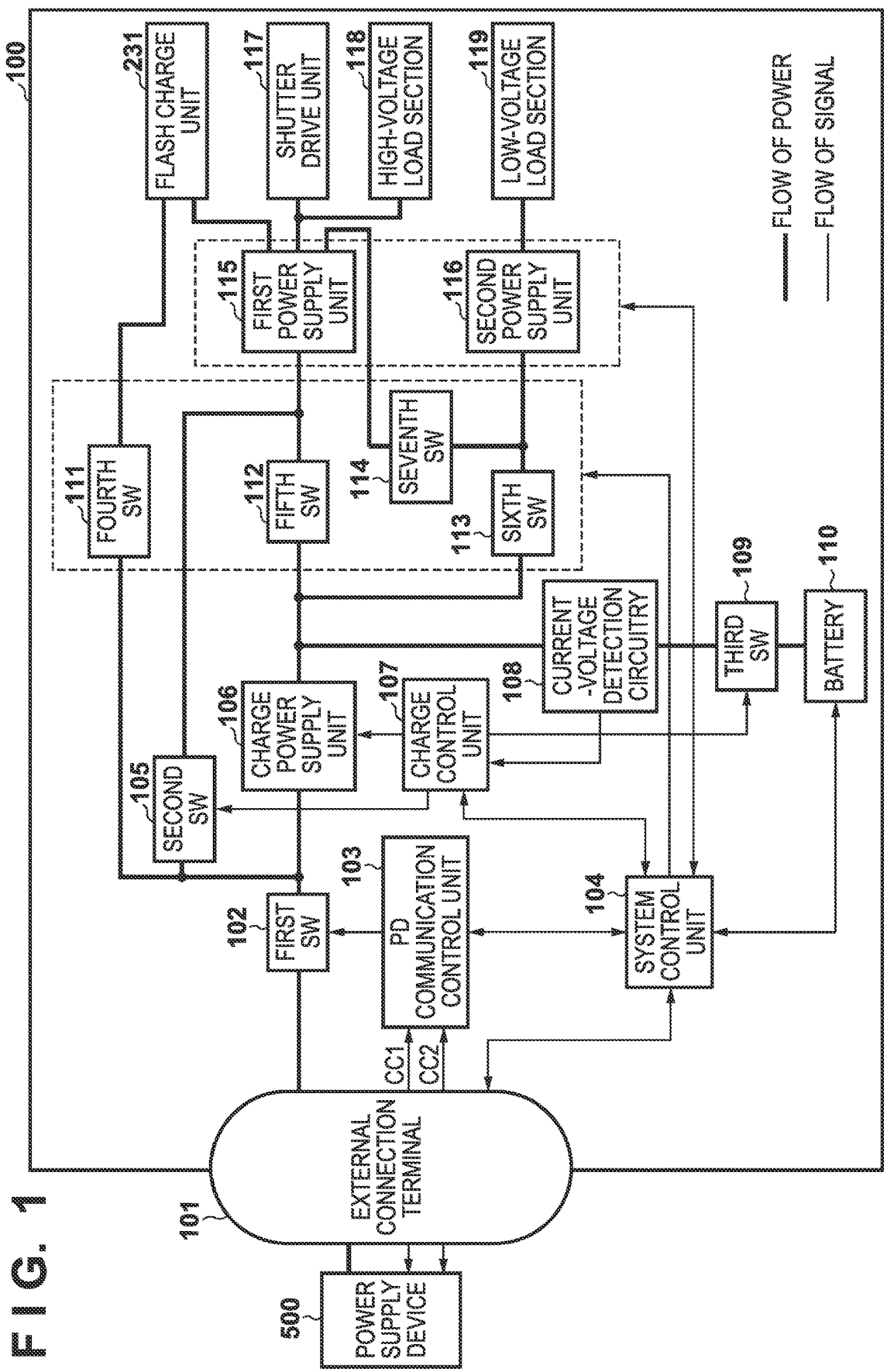
FIG. 1 is a block diagram illustrating components according to a power supply operation of image capture apparatus 100 according to a first embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

Hereinafter, the image capture apparatus 100 according to the first embodiment will be described.

FIG. 1 is a block diagram illustrating components according to a power supply operation of image capture apparatus 100 according to a first embodiment.

In the first embodiment, a case where the image capture apparatus 100 is a digital camera capable of continuous shooting (burst shooting) using a flash will be described. However, the image capture apparatus 100 is not limited to the digital camera, and may be a smart phone, a tablet PC, or the like capable of continuous shooting (burst shooting) using the flash.

The image capture apparatus 100 is connected to power supply device 500 via external connection terminal 101. The power supply device 500 is, for example, connected to a commercial AC outlet to operate by an AC power source. The external connection terminal 101 is a terminal compliant with Universal Serial Bus (USB) Type-C standard. The external connection terminal 101 includes VBUS terminal for power supply, CC1 terminal and CC2 terminal for detecting a connection of an external device and for communicating with the external device, D+terminal and D-terminal for performing communication compliant with USB2.0 standard, and GND terminal or the like. The external connection terminal 101 is a terminal compliant with Programmable Power Supply (PPS) function compliant with USB Power Delivery (PD) standard. Voltages according to requests of the image capture apparatus 100 as a Device, is supplied from the power supply device 500 to the external connection terminal 101. The image capture apparatus 100 is connected to the power supply device 500, for example, by a cable compatible with the USB Type-C standard.

First switch circuitry 102 has circuitry for switching to ON state where the power supply to the image capture apparatus 100 is performed via the external connection terminal 101 or OFF state where the power supply to the image capture apparatus 100 is not performed via the external connection terminal 101. The first switch circuitry 102 is comprised of, for example, a switching element such as Field Effect Transistor (FET), and is controlled to switch to ON state or OFF state by PD communication control unit 103.

The PD communication control unit 103 can detect a connection with an external device and can perform communication with an external device compliant with USB PD standard by CC1 terminal and CC2 terminal. The PD communication control unit 103 controls the first switch circuitry 102 to ON state or OFF state in accordance with a control command from system control unit 104 or the state of the power supply from the power supply device 500 connected to the external connection terminal 101. The PD communication control unit 103 transmits and receives information of voltage and/or current at the time of the power supply to the power supply device 500 using CC1 terminal or CC2 terminal in accordance with the control command of the system control unit 104.

The system control unit 104 executes various processing (programs) in accordance with an instruction from the user received by a user interface (UI) unit to control each component of the image capture apparatus 100 or to control data transfer between the components. The system control unit 104 may be a microcomputer in which the CPU and memory are configured as a hardware processor.

Second switch circuitry 105 has circuitry for switching to either ON state where the power supply to the first power supply unit 115 is performed via the external connection terminal 101 or OFF state where the power supply to the first power supply unit 115 is not performed via the external connection terminal 101. The second switch circuitry 105, for example, is comprised of an element such as a FET. The second switch circuitry is controlled to ON state or OFF state by charge control unit 107.

Charge power supply unit 106 converts a voltage supplied from the external connection terminal 101 to a predetermined voltage. The charge power supply unit 106 is, for example, a buck-boost type DC/DC converter circuitry comprised of an inductor element, a capacitor element and a switching element and capable of stepping-up and stepping-down operations of the voltage. It is possible to convert the voltage from the external connection terminal 101 can be converted to the predetermined voltage by performing operations of charging and discharging an energy of the inductor element by ON and OFF operations of the switching elements. The switching elements are controlled to ON state or OFF state by the charge control unit 107.

The charge control unit 107 includes circuitry for controlling the charge power supply unit 106 based on the voltage and the current detected by current-voltage detection circuitry 108. When the charging control unit 107 charges battery 110, the charge control unit 107 controls the output voltage of the charge power supply unit 106 so that the terminal voltage and a charge current of the battery 110 comes to a predetermined value.

The current-voltage detection circuitry 108 has circuitry for detecting the terminal voltage of the battery 110 and the charge current to the battery 110 or the discharge current from the battery 110. The detection values of the terminal voltage, the charge current and the discharge current detected by the current-voltage detection circuitry 108 are notified to the charge control unit 107.

Third switch circuitry 109 has circuitry for switching to ON state to enable the power supply by connecting the power supply path from the battery 110 to the image capture apparatus 100 or OFF state to disable the power supply by disconnecting the power supply path from the battery 110 to the image capture apparatus 100. The third switch circuitry 109 is comprised of an element such as a FET. The third switch circuitry 109 is controlled to ON state or OFF state by the charge control unit 107.

The battery 110 can be easily attached to and removed from the image capture apparatus 100 by an attachment/ejection mechanism that is not shown. The battery 110 is, for example, a chargeable power supply unit comprised of two battery cells. The battery cells included in the battery 110 are, for example, lithium ion battery cells comprised of a lithium ion polymer or the like. The two battery cells of the battery 110 are connected in series, for example. The battery 110 supplies power to the image capture apparatus 100 via the third switch circuitry 109. The battery 110 is charged by the power converted by the charge power supply unit 106. For example, in a case where the battery 110 is fully charged, the voltage of the battery 110 is, for example, about 8.4V. The termination voltage of the battery 110 is, for example, about 6.0V. Note that the number of battery cells included in the battery 110 is not limited to two, and may be one or three or more.

Fourth switch circuitry 111, fifth switch circuitry 112, sixth switch circuitry 113 and seventh switch circuitry 114 have circuitry which are controlled to ON state or OFF state by the system control unit 104, and comprised of, for example, a switch element such as a FET. The fourth switch circuitry 111 has circuitry for switching the power supply source to the flash charge unit 231 and controlled to ON state or OFF state by the system control unit 104.

The fifth switch circuitry 112 has circuitry for switching the power supply source to first power supply unit 115 and controlled to ON state or OFF state by the system control unit 104. The fifth switch circuitry 112 and the second switch circuitry 105 is controlled so as not to be in ON state simultaneously.

The sixth switch circuitry 113 and the seventh switch circuitry 114 have circuitry for switching the power supply source to second power supply unit 116 and controlled to ON state or OFF state by the system control unit 104. The sixth switch circuitry 113 and the seventh switch circuitry 114 are controlled so as not to be in ON state simultaneously.

The first power supply unit 115 has a plurality of voltage conversion circuitry for stepping up and down the input voltage. The first power supply unit 115 includes a voltage conversion circuitry such as a boost-type DC/DC converter circuitry or a buck-boost type DC/DC converter circuitry comprised of, for example, an inductor element, a capacitor element and a switching element. The first power supply unit 115 receives the voltage of the input voltage range 5V to 15V in the first embodiment, and supplies the voltage of the output voltage 3.3V to 25V to the high-voltage load section 118.

The second power supply unit 116 has a plurality of voltage conversion circuitry for stepping down the input voltage. The second power supply unit 116 includes a voltage conversion circuitry such as a buck-type DC/DC converter circuitry comprised of, for example, an inductor element, a capacitor element and a switching element. The second power supply unit 116 receives the voltage of 3.3V in the first embodiment, and supplies the voltage of the output voltage 0.7V to 1.8V to the low-voltage load section 119.

The flash charge unit 231 includes charge circuitry for performing charge accumulation to the main capacitor 304 to be described later.

Shutter drive unit 117 includes drive circuitry for driving the shutter unit 203 in accordance with a control command from the system control unit 104.

High-voltage load section 118 includes load circuitry driven at high voltage as a backlight unit 212 to be described later.

Low-voltage load section 119 includes load circuitry driven at a low voltage as an image capturing unit 204 or the image processing unit 206 to be described later.

The power supply device 500 transmits and receives information of the voltage and/or current to be supplied to the image capture apparatus 100 between the PD communication control unit 103. The power supply device 500 supplies the voltage and/or current requested from the PD communication control unit 103 via the external connection terminal 101 to the image capture apparatus 100.

Figure 2:
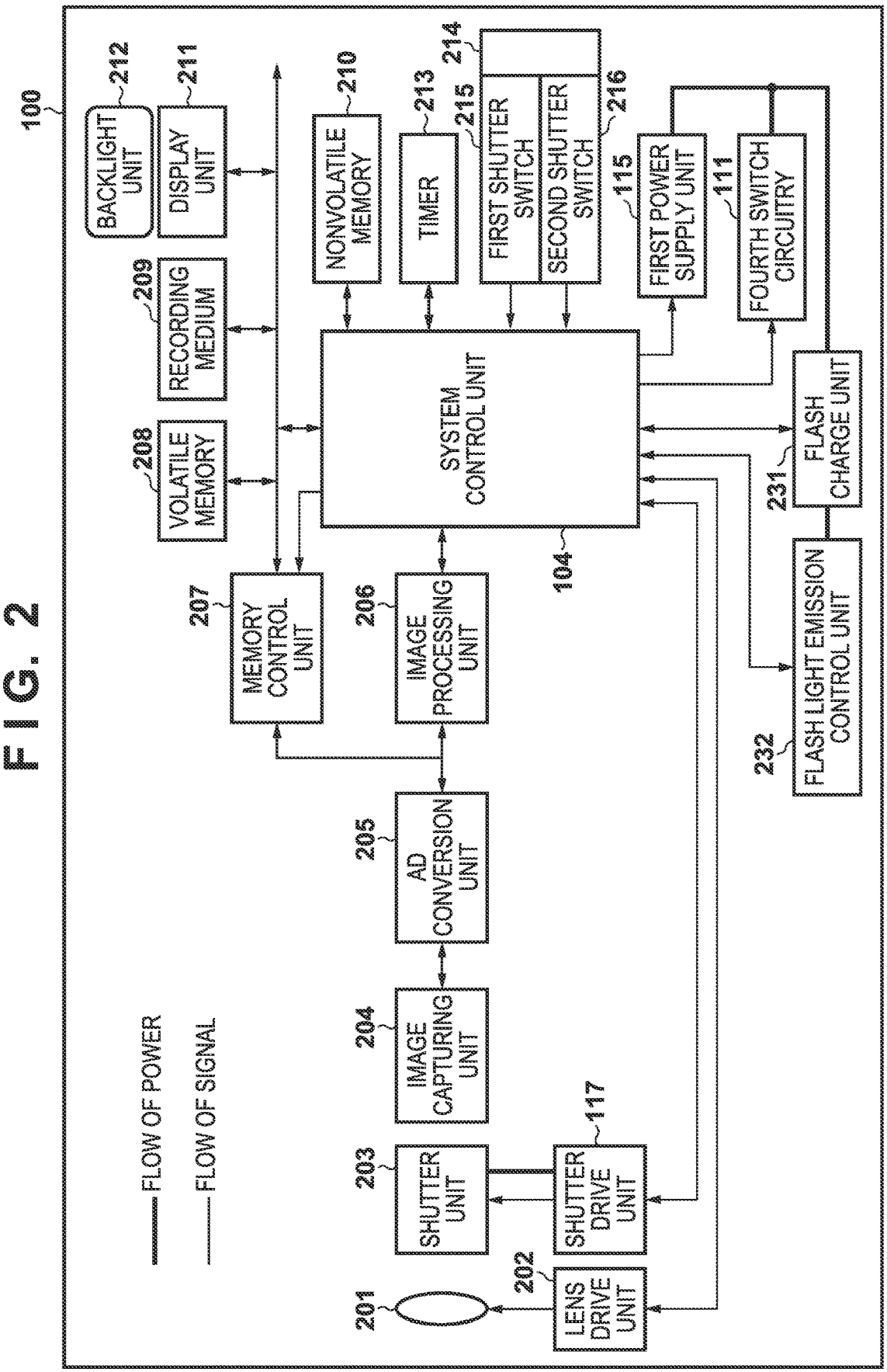
FIG. 2 is a block diagram illustrating components according to a shooting operation of the image capture apparatus 100 according to the first embodiment.

FIG. 2 is a block diagram illustrating components according to the shooting operation of the image capture apparatus 100 according to the first embodiment.

Lens group 201 is an optical system for forming an optical image of a subject image to the image capturing unit 204 to be described later. The lens group 201 has an aperture mechanism for reducing the amount of light, a zoom mechanism for changing the focal length by changing the lens position, a focus mechanism for focusing by changing the lens position.

Lens drive unit 202 includes drive circuitry for controlling the aperture mechanism, the zoom mechanism and the focus mechanism of the lens group 201 in accordance with a control command from the system control unit 104.

Shutter unit 203 is a mechanism for controlling the exposure time of the optical image of the subject reaching the image capturing surface of image capturing unit 204 by opening and closing the incident light path from the lens group 201 to the image capturing unit 204. The shutter unit 203 includes a shutter curtain for shielding the incident light path, a curtain traveling member for causing the shutter curtain to travel, and a motor for driving the curtain traveling member. The shutter unit 203 further includes a biasing member for applying a biasing force to the curtain traveling member, and a latch member for latching the curtain traveling member in a state where the biasing force of the biasing member is accumulated. One end of the biasing member is fixed and another end of the biasing member is connected to the curtain traveling member. The biasing force is accumulated by moving the curtain traveling member against the biasing force of the biasing member by a motor. The latch member is moved by the motor to a position where the curtain traveling member is retained in the state that the biasing force of the biasing member is accumulated, and the curtain traveling member is caused to travel by releasing the retained state of the curtain traveling member.

The image capturing unit 204 is an image sensor having an image capturing surface in which photoelectric conversion elements such as Complementary Metal Oxide Semiconductor (CMOS) or Charge Coupled Device (CCD) are arranged two dimensionally. The optical image of the subject incident through the lens group 201 of the image capture apparatus 100 is formed on the image capturing surface of the image capturing unit 204.

AD conversion unit 205 includes circuitry for converting analog signal output from the image capturing unit 204 into digital signal.

Image processing unit 206 is a processor such as a Graphics Processing Unit (GPU) that performs image processing such as resizing processing such as predetermined pixel interpolation and reduction or color conversion processing on the image data outputted from the AD conversion unit 205. Further, in the image processing unit 206, a predetermined calculation process is performed using the captured image data, the system control unit 104 performs exposure control and focusing control based on the obtained calculation result. In this way, Auto Focus (AF) processing, Auto Exposure (AE) processing, Flash pre-emission (EF) processing of Through-The Lens (TTL) method is performed. The image processing unit 206 further performs predetermined calculation processing using the image data, and performs Auto White Balance (AWB) processing of the TTL method based on the calculation result. Further, the image processing unit 206 converts the image data that has been processed into an image file of a predetermined format (e.g., JPEG) and records the image file on the recording medium 209. The image processing unit 206 also generates display data for displaying an image on the display unit 211, etc. The image processing can be performed on the entire area of the image data or on the partial area of the image data.

Memory control unit 207 controls transmission and reception of data between the AD conversion unit 205, the image processing unit 206, volatile memory 208, recording medium 209, and display unit 211. The data of the AD conversion unit 205 is written into the volatile memory 208 through the image processing unit 206 and the memory control unit 207, or the data of the AD conversion unit 205 is written into the volatile memory 208 directly through the memory control unit 207.

The volatile memory 208 is a semiconductor memory such as a DRAM capable of reading and writing data at high speed. The volatile memory 208 is used as a working area for loading constants and variables for the operation of the system control unit 104, and programs read from the non-volatile memory 210, and the like. The volatile memory 208 is used as a buffer memory for temporarily storing image data captured by the image capturing unit 204 or as an image display memory of the display unit 211.

The recording medium 209 is a storage device capable of newly writing an image file or reading out an already recorded image file. The recording medium 209 is a memory card, a hard disk or the like detachable from the image capture apparatus 100, or a flash memory, a hard disk or the like built in the image capture apparatus 100.

The nonvolatile memory 210 is a semiconductor memory such as a flash ROM or an EEPROM capable of reading and writing data. The nonvolatile memory 210 stores constants, programs and the like for the operation of the system control unit 104, characteristic data and the like of the display unit 211, image processing parameters and the like of the image processing unit 206.

The display unit 211 performs display of a viewfinder image at the time of shooting, display of a shot image, display of characters for interactive operation, and the like. The display unit 211 is, for example, a display device such as a liquid crystal display or an organic EL display. The display unit 211 may be integrated with the image capture apparatus 100 or may be an external device connected to the image capture apparatus 100. It is sufficient that the image capture apparatus 100 is capable of connecting with the display unit 211 and has a function of controlling the display of the display unit 211.

The display unit 211 includes a UI unit (e.g., a touch panel) that receives an instruction from a user. The touch panel detects a touch operation by a user's finger or a stylus with respect to a display surface of the display unit 211, and outputs operation signal corresponding to the touch operation to the system control unit 104.

The display unit 211 can display a menu screen stored in the image display data area of the nonvolatile memory 210 or an image file stored in the recording medium 209 in accordance with a control command from the system control unit 104. The display unit 211 functions as an Electronic View Finder (EVF) that performs live view by sequentially displaying image data output from the image capturing unit 204.

Backlight unit 212 illuminates the display unit 211 from the backside. Since LCD display is a display which cannot emit light by itself, visibility as a display device is realized by irradiating illumination light from the back side. The backlight unit 212 is comprised of a light emitting diode (LED), an organic light emitting diode (OLED), a fluorescent tube, or the like. The backlight unit 212 can turn on or off the illumination in accordance with a control command from the system control unit 104.

In the first embodiment, the backlight unit 212 is configured by serially connecting five white LEDs having the following characteristics.

VF (forward voltage): 3.75 [V], where IF (forward current)=26.7 mA

Voltage required to drive the LEDs is 3.75×5=15 [V], power is supplied from the first power supply unit 115 to the backlight unit 212.

Timer 213 is a time measurement unit for measuring time used for various controls or time of a built-in clock. The system control unit 104 controls each component of the image capture apparatus 100 based on the time measured by the timer 213. In addition, the timer 213 measures flash charging time Ta and Tb in a flash charge mode which will be described later in FIG. 6.

Shutter-release button 214 is an operation member for performing a shooting start instruction or a shooting preparation instruction. The shutter button 214 has first shutter switch 215 and second shutter switch 216.

While the shutter-release button 214 is being operated, that is, pressed halfway (the shooting preparation instruction) as an operation at the time of shooting by the user, the first shutter switch 215 is turned to ON state and generates first shutter switch signal SW1. In response to the first shutter switch signal SW1 being turned to ON state, the system control unit 104 starts shooting preparation operations such as the AF processing, the AE processing, the AWB processing and the EF processing by controlling the image capturing unit 204.

When the shutter-release button 214 is completed, that is, the shutter-release button 214 is pressed fully (the shooting start instruction) as an operation at the time of shooting by the user, the second shutter switch 216 is turned to ON state and generates second shutter switch signal SW2. In response to the second shutter switch signal SW2 being turned to ON state, the system control unit 104 starts a series of shooting operations from reading out signal from the image capturing unit 204 to writing of image data to the recording medium 209. Then, the system control unit 104 ends the shooting operations in response to the second shutter switch signal SW2 being turned to OFF state (shooting end instruction).

The flash charge unit 231 includes circuitry for controlling charging of a main capacitor 304 for emitting flash light in accordance with a control command from the system control unit 104.

The flash light emission control unit 232 includes circuitry for controlling a light emission amount or a light emission timing of the flash in accordance with a control command from the system control unit 104. Note that a flash unit of the image capture apparatus 100 is configured by the flash charge unit 231 and the flash light emission control unit 232.

FIG. 3 is a diagram illustrating circuitry of the flash charge unit 231 and the flash light emission control unit 232 of the image capture apparatus 100 according to the first embodiment.

The flash charge unit 231 includes step-up transformer 301, switching control switch 302 of the step-up transformer 301, diode 303 and main capacitor 304.

Current flows to the primary side of the step-up transformer 301 when the switching control switch 302 is turned to ON state. The switching control switch 302 is turned to OFF state when the peak value of the primary current comes to a predetermined value. When the switching control switch 302 is turned to OFF state, the current starts to flow to the secondary side of the step-up transformer 301 and the main capacitor 304 is charged. When the secondary side current stops, the switching control switch 302 is turned to ON state again and the current flows to the primary side of the step-up transformer 301. A charge voltage for the main capacitor 304 is monitored by the system controller 104. The system control unit 104 repeats the control of ON state or OFF state of the switching control switch 302 until the charge voltage comes to a predetermined value.

The flash light emission control unit 232 includes trigger capacitor 305, trigger coil 307, xenon tube 308 and Insulated Gate Bipolar Transistor (IGBT) 306. When the IGBT306 is turned on, electric charge accumulated in the trigger capacitor 305 is stepped up by the trigger coil 307 to several thousand volts. Xenon of the xenon tube 308 is ionized by the stepped up voltage of the trigger coil 307 and is in a conductive state. Electric charge accumulated in the main capacitor 304 flows into the xenon tube 308 in the conductive state and the xenon tube 308 emits light. The system control unit 104 controls the light emission amount and the light emission timing of the flash by controlling the IGBT306 to ON state and OFF state.

The user can change shooting parameters of the image capture apparatus 100 by operating a menu screen or the like displayed by the UI unit of the display unit 211. The user can change an operation mode of the image capture apparatus 100 by operating a switch included in the image capture apparatus 100. The operation mode of the image capture apparatus 100 includes a flash light emission enabled mode and a flash light emission disabled mode.

Note that an external flash can be connected to the image capture apparatus 100 via an accessory shoe (not shown). The image capture apparatus 100 can also supply power to the external flash connected via the accessory shoe and control the external flash. In addition, depending on the type of the external flash, the voltage and/or the current to be supplied to the external flash by the image capture apparatus 100 can be changed, for example, power can be supplied at 6V to the external flash in the case where the maximum light emission amount of the external flash connected to the image capture apparatus 100 is large, and power can be supplied at 3V to the external flash in the case where the maximum light emission amount of the external flash is small.

Next, shooting operations of the image capture apparatus 100 according to the first embodiment will be described with reference to the flowcharts of FIGS. 4A to 4C.

Figure 4A:
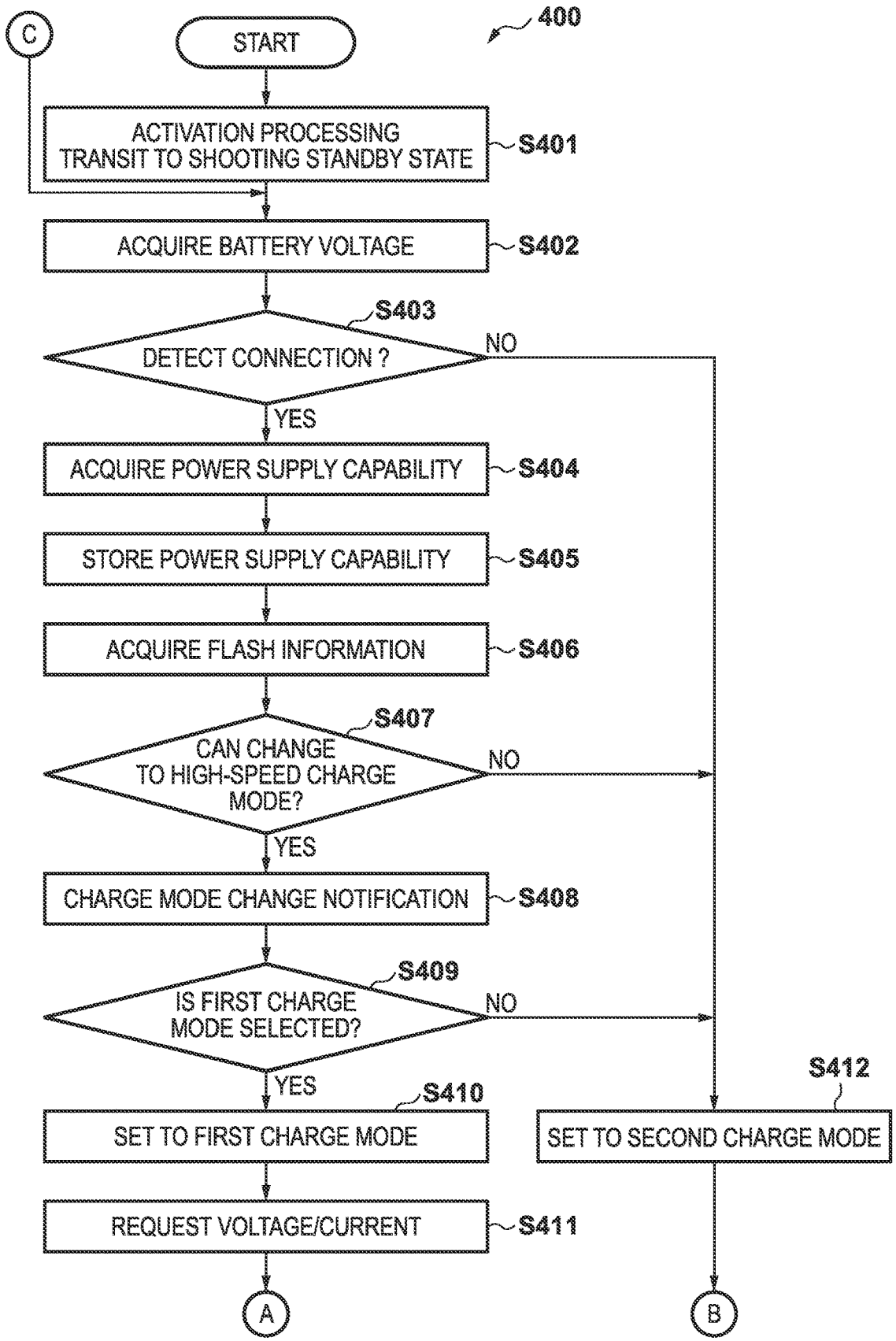
FIGS. 4A to 4C are flowcharts illustrating an example of the shooting operation of the image capture apparatus 100 according to the first embodiment.
Figure 4B:
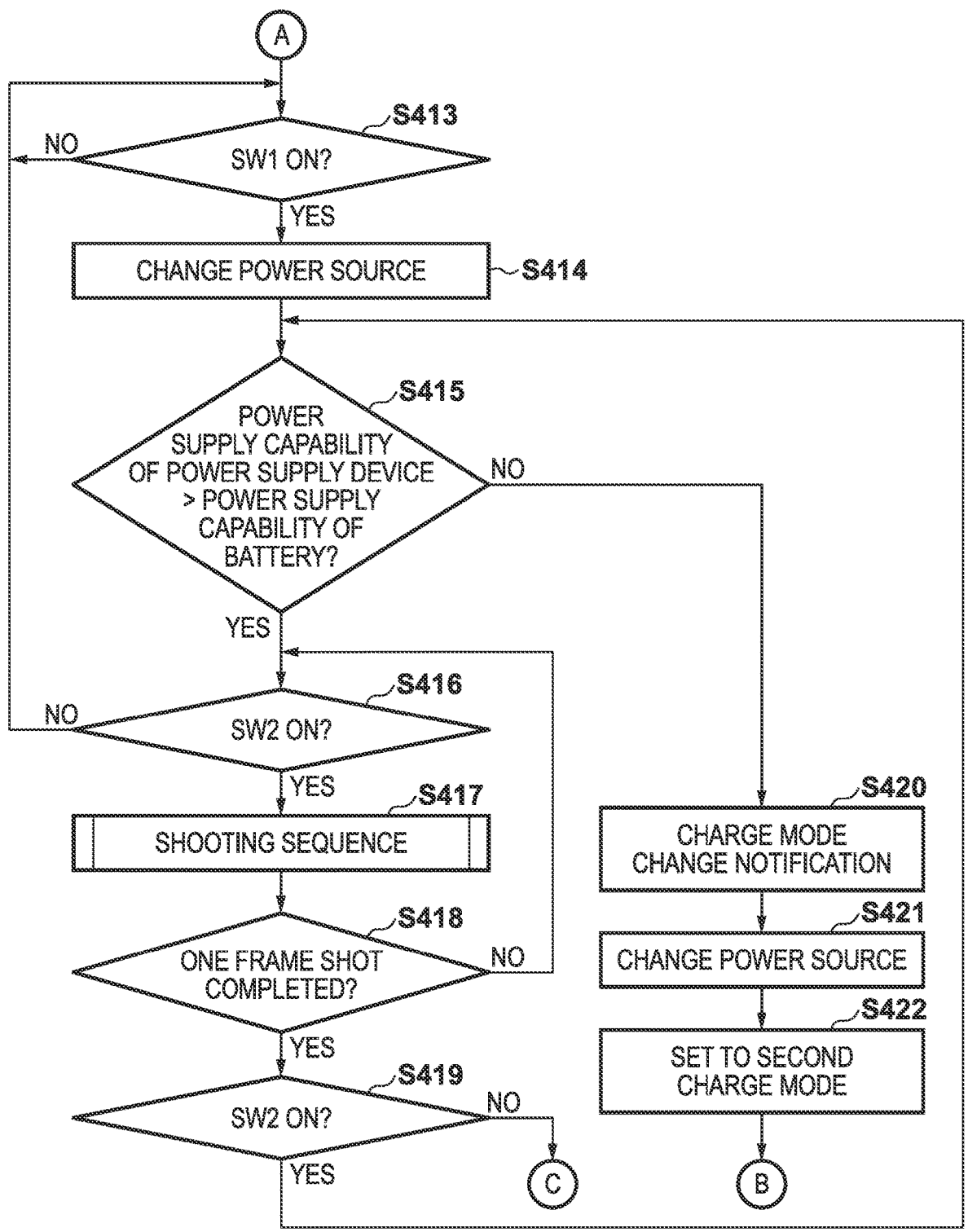
Figure 4C:
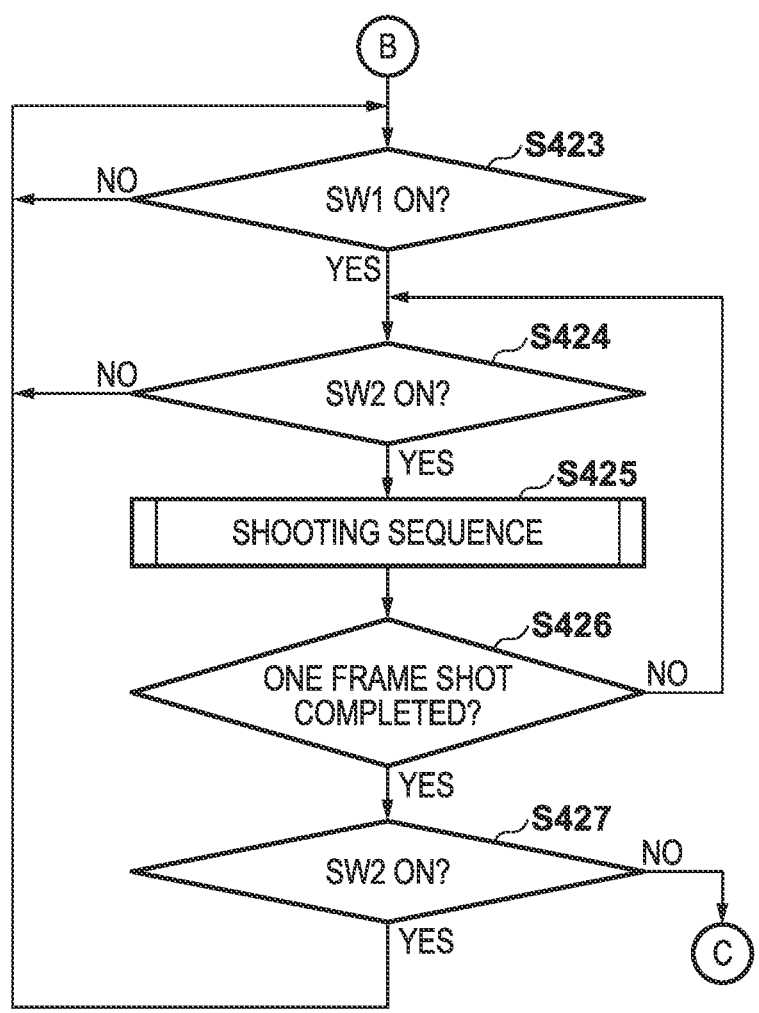

The processing of FIGS. 4A to 4C is realized by the system control unit 104 executing the programs stored in nonvolatile memory 210 to control each component of the image capture apparatus 100.

The processing of FIG. 4A is started when the battery 110 is installed in the image capture apparatus 100 and the instruction is made by the user for turning on the power of the image capture apparatus 100.

In step S401, the system control unit 104 uses the power from the battery 110 to supply the power to each component of the image capture apparatus 100, performs activation processing of the image capture apparatus 100, and transits to the shooting standby state. In the shooting standby state, the image capturing for acquiring a live view image is performed by the image capturing unit 204. The image captured by the image capturing unit 204 is processed by the AD conversion unit 205 and the image processing unit 206. The image processed by the image processing unit 206 is output to the volatile memory 208 via the memory control unit 207, and first stored in the volatile memory 208. The image is then read from the volatile memory 208 at the appropriate timing, output to the display unit 211, and displayed on the display unit 211 as the live-view image. Furthermore, in the shooting standby state, the system control unit 104 controls the image processing unit 206 to superimpose various information on the live-view image and can display the superimposed image on the display unit 211.

In step S402, the system control unit 104 acquires the terminal voltage of the battery 110 by the current-voltage detection circuitry 108, and advances the processing 400 to step S403.

In step S403, the system control unit 104 determines whether or not the power supply device 500 is connected to the image capture apparatus 100 by monitoring the external connection terminal 101 or by information from the PD communication control unit 103. When the system control unit 104 determines that the power supply device 500 is connected to the image capture apparatus 100, the system control unit 104 advances the processing 400 to step S404.

When the system control unit 104 determines that the power supply device 500 is not connected to the image capture apparatus 100, the system control unit 104 advances the processing 400 to step S412.

In step S404, the system control unit 104 determines a power supply capability of the power supply device 500 connected to the image capture apparatus 100. The determination of the power supply capability is implemented by measuring the terminal voltage of the external connection terminal 101 or by communicating with the power supply device 500 via the PD communication control unit 103.

In step S405, the system control unit 104 holds the power supply capability of the power supply device 500 determined in step S404 in the volatile memory 208 and advances the processing 400 to step S406.

In step S406, the system control unit 104 acquires the information of the flash to be used at the time of shooting, and advances the processing 400 to step S407. The system control unit 104 acquires at least information on the maximum voltage that can be input by the flash charge unit 231 and the voltage of the battery when fully charged.

In step S407, the system control unit 104 determines whether or not the flash charging time of the image capture apparatus 100 can be shortened from the battery voltage acquired in step S402 and the power supply capacity of the power supply device 500 acquired in step S405. The system control unit 104 determines the power supply capability of the power supply device 500 according to a determination condition shown in FIG. 5 and determines whether or not the flash charge mode of the image capture apparatus 100 can be changed to a high-speed charge mode. FIG. 5 is a diagram illustrating an example of the determination condition of the flash charge mode of the image capture apparatus 100 according to the first embodiment. In FIG. 5, when the power supply capacity of the power supply device 500 exceeds the power supply capacity of the battery 110 (the output voltage and the output current of the power supply device 500 exceeds the terminal voltage and a discharge current of the battery 110), it is determined that the flash charge mode of the image capture apparatus 100 can be changed to the high-speed charge mode. In contrast, when the power supply capacity of the power supply device 500 is equal to or less than the power supply capacity of the battery 110 (the output voltage and the output current of the power supply device 500 is equal to or less than the terminal voltage and the discharge current of the battery 110), it is determined that the flash charge mode of the image capture apparatus 100 cannot be changed to the high-speed charge mode. In FIG. 5, a first charge mode is a flash charge mode in which the image capture apparatus 100 is operating by the power of the battery 110 and the power of the power supply device 500. A second charge mode is a flash charge mode in which the image capture apparatus 100 is operating by only the power of the battery 110. When the power supply capability of the power supply device 500 connected to the image capture apparatus 100 exceeds the power supply capability of the battery 110, the flash charge mode of the image capture apparatus 100 can be changed to the first charge mode in which the flash charging time is faster than that in the second charge mode. For example, it is assumed that the power supply capacity of the battery 110 of the image capture apparatus 100 is the terminal voltage 8.4V and the discharge current 3A when the battery 110 is fully charged. In this case, when the power supply capacity of the power supply device 500 exceeds the output voltage 8.4V and the output current 3A, the first charge mode is selectable. In contrast, in a state where the power supply capacity of the battery 110 of the image capture apparatus 100 drops to the terminal voltage 7.2V and the discharge current 3A, when the power supply capacity of the power supply device 500 exceeds the output voltage 7.2V and the output current 3A, the first charge mode is selectable. When the system control unit 104 determines that the flash charge mode can be changed to the high-speed charge mode, the system control unit 104 advances the processing 400 to step S408. When the system control unit 104 determines that the flash charge mode cannot be changed to the high-speed charge mode, the system control unit 104 advances the processing 400 to step S412. The operations of the flash charge unit 231 in the first and second charge modes will be described later.

Figure 8A:
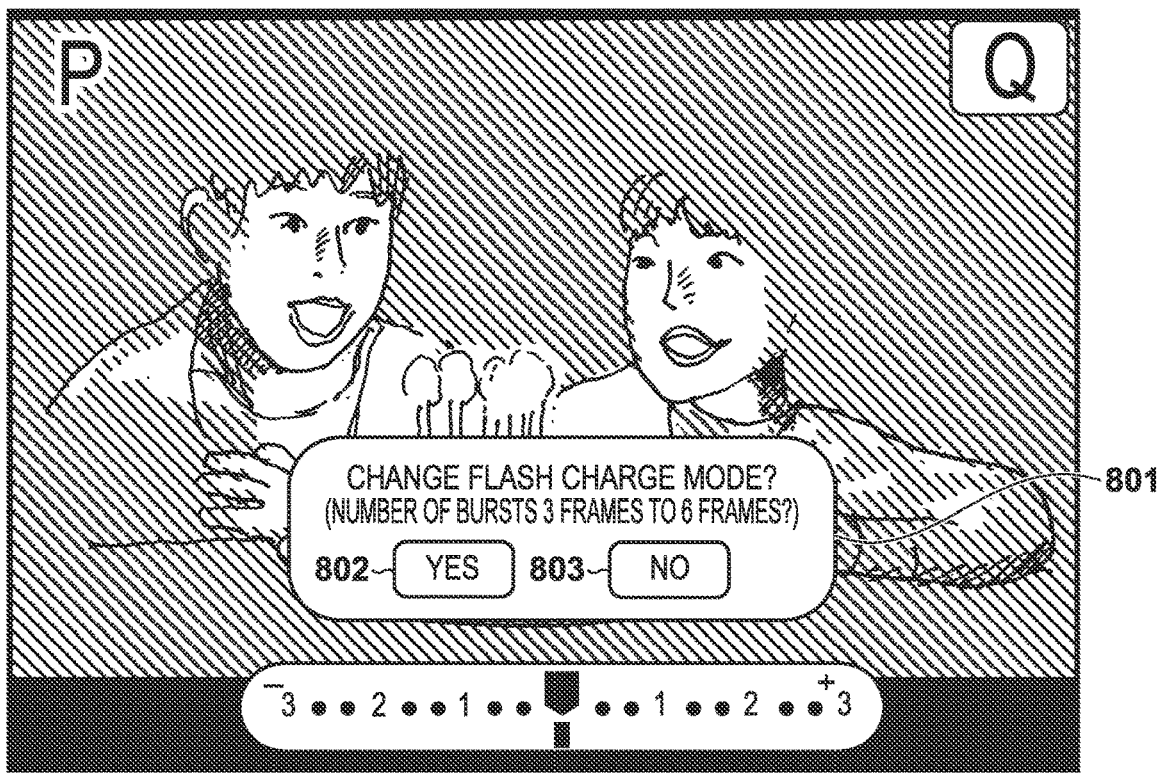
FIGS. 8A to 8C are diagrams illustrating examples of display screens in a flash shooting of the image capture apparatus 100 according to the first embodiment.

In step S408, the system control unit 104 displays a screen to notify the user that the flash charge mode can be changed on the display unit 211, and advances the processing 400 to step S409. The screen displayed on the display unit 211 includes, for example, a dialogue 801 and buttons 802 and 803 shown in FIG. 8A. FIG. 8A is a diagram illustrating an example of a display screen for a live-view image in the image capture apparatus 100 according to the first embodiment. The dialogue 801 indicates that the flash charge mode can be changed and contents to be changed in the flash charge mode. The button 802 is a selection item for permitting changes as notified in the dialog 801. The button 803 is a selection item for rejecting changes as notified in the dialog 801.

Figure 8B:
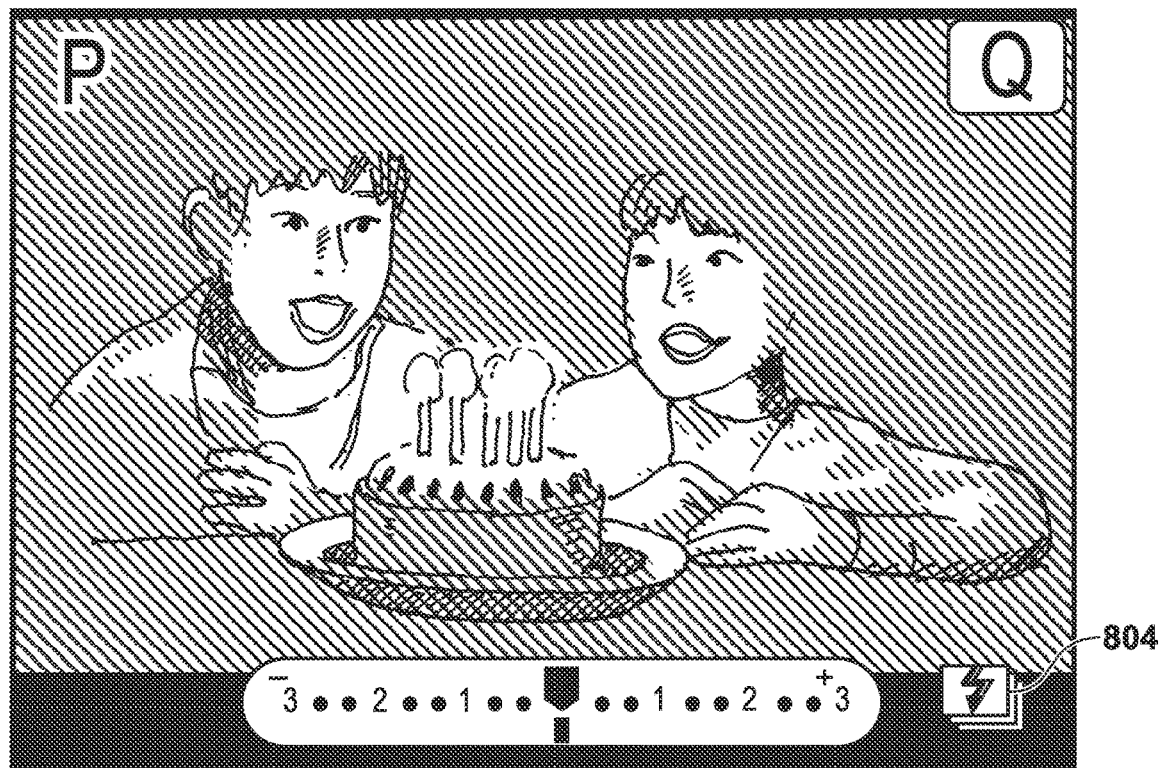

FIG. 8B illustrates an example of a display screen when the button 802 is selected on the screen of FIG. 8A. In the screen shown in FIG. 8B, icon 804 which indicates that the first charge mode is selected, and that shooting speed (frame speed) is not slowed at the time of continuous shooting using the flash, is displayed.

Figure 8C:
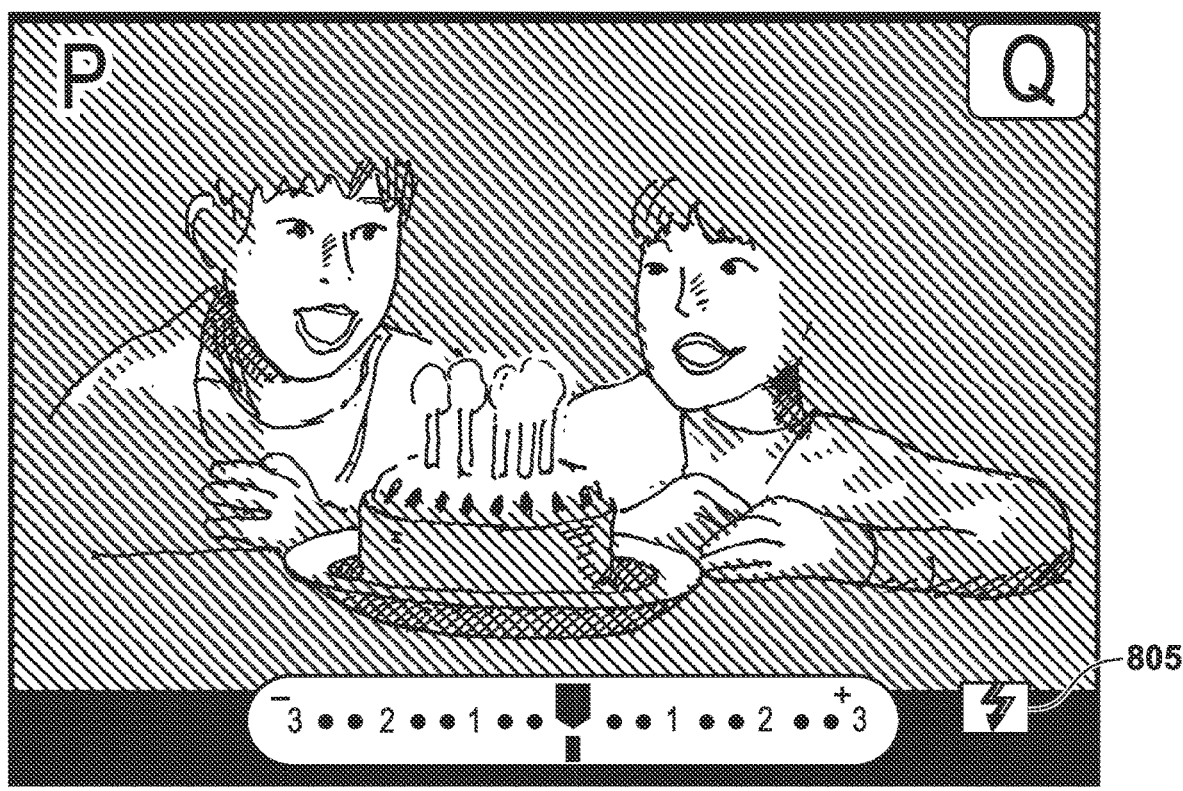

FIG. 8C illustrates an example of a display screen when the button 803 is selected on the screen of FIG. 8A. In the screen shown in FIG. 8C, icon 805 which indicates that the second charge mode is selected, and that shooting speed (frame speed) is slowed at the time of continuous shooting using the flash.

In step S409, the system control unit 104 determines whether one of the buttons 802 and 803 is selected on the screen displayed on the display unit 211 in step S408. When the user selects the button 802 using a touch panel or the like, the system control unit 104 advances the processing 400 to step S410. When the user selects the button 803, the system control unit 104 advances the processing 400 to step S412.

In step S410, the system control unit 104 reads out parameters from the nonvolatile memory 210 so as to set the flash charging time Ta (<the flash charging time Tb of the second charge mode) of the first charge mode according to the flash information acquired in step S406.

In step S411, the PD communication control unit 103 requests a voltage and a current to the power supply device 500 based on the flash information acquired in step S406, and advances the processing 400 to step S413. The PD communication control unit 103 determines the voltage and current to be requested to the power supply device 500 based on the voltage and the current that the flash charge unit 231 can input. For example, when a built-in flash in the image capture apparatus 100 is used, 8.4V that is the maximum value of the terminal voltage when the battery 110 is fully charged, is requested. When the external flash is used, the external flash is determined based on the flash information acquired in step S406, for example, 6V is supplied to the flash when the maximum light emission amount is large, and 3V is supplied to the flash when the maximum light emission amount is small.

In step S412, the system control unit 104 reads out parameter from the nonvolatile memory 210 so as to set the flash charging time Tb (>the flash charging time Ta of the first charge mode) of the second charge mode according to the flash information acquired in step S408.

In step S413, the system control unit 104 determines whether or not the first shutter switch signal SW1 is in ON state. When the system control unit 104 determines that the first shutter switch signal SW1 is in ON state, the system control unit 104 advances the processing 400 to step S414. When the system control unit 104 determines that the first shutter switch signal SW1 is not ON state, the system control unit 104 repeats the processing of step S413.

In step S414, the system control unit 104 changes the power supply of the flash charge unit 231 from the first power supply unit 115 to the power supply device 500 by switching the fourth switch circuitry 111 to ON state. Thereafter, the system control unit 104 advances the processing 400 to step S415.

In step S415, the system control unit 104 determines whether the power supply capability of the power supply device 500 exceeds the power supply capability of the battery 110. Also in step S415, it is determined whether the power supply capability of the power supply device 500 exceeds the power supply capability of the battery 110 based on the determination condition shown in FIG. 5. When the system control unit 104 determines that the power supply capability of the power supply device 500 exceeds the power supply capability of the battery 110 according to the determination condition of FIG. 5, the system control unit 104 advances the processing 400 to step S416. When the system control unit 104 determines that the power supply capability of the power supply device 500 does not exceed the power supply capability of the battery 110, the system control unit 104 advances the processing 400 to step S420.

In step S416, the system control unit 104 determines whether or not the second shutter switch signal SW2 is in ON state. When the system control unit 104 determines that the second shutter switch signal SW2 is in ON state, the system control unit 104 advances the processing 400 to step S417. When the system control unit 104 determines that the second shutter switch signal SW2 is not ON state, the system control unit 104 advances the processing 400 to step S413.

In step S417, the system control unit 104 controls the image capture apparatus 100 and executes a shooting sequence, and advances the processing 400 to step S418.

In step S418, the system control unit 104 determines whether or not shooting for one frame has been completed. When the system control unit 104 determines that the shooting for one frame has been completed, the system control unit 104 advances the processing 400 to step S419. When the system control unit 104 determines that the shooting for one frame has not been completed, the system control unit 104 advances the processing 400 to step S416.

In step S419, the system control unit 104 determines whether or not the second shutter switch signal SW2 is in ON state. When the system control unit 104 determines that the second shutter switch signal SW2 is in ON state, the system control unit 104 advances the processing 400 to step S415. When the system control unit 104 determines that the second shutter switch signal SW2 is not ON state, the system control unit 104 advances the processing 400 to step S402.

In step S420, the system control unit 104 displays a notification to change the charge mode on the display unit 211, and advances the processing 400 to step S421. In the first embodiment, for example, the icon 804 indicating the first charge mode of FIG. 8B is displayed and caused to blink, and the display unit 211 is switched from the screen of FIG. 8B to the screen of FIG. 8C.

In step S421, the system control unit 104 stops the power supply from the power supply device 500 to the flash charge unit 231 by switching the fourth switch circuitry 111 to OFF state. The system control unit 104 changes the power supply to the flash charge unit 231 to be supplied from the first power supply unit 115. Thereafter, the system control unit 104 advances the processing 400 to step S422.

In step S422, the system control unit 104 reads out parameter from the nonvolatile memory 210 so as to set the flash charging time Tb (>the flash charging time Ta of the first charge mode) of the second charge mode according to the flash information acquired in step S408.

In step S423, the system control unit 104 determines whether or not the first shutter switch signal SW1 is in ON state. When the system control unit 104 determines that the first shutter switch signal SW1 is in ON state, the system control unit 104 advances the processing 400 to step S424. When the system control unit 104 determines that the first shutter switch signal SW1 is not ON state, the system control unit 104 repeats the processing of step S423.

In step S424, the system control unit 104 determines whether or not the second shutter switch signal SW2 is in ON state. When the system control unit 104 determines that the second shutter switch signal SW2 is in ON state, the system control unit 104 advances the processing 400 to step S425. When the system control unit 104 determines that the second shutter switch signal SW2 is not ON state, the system control unit 104 advances the processing 400 to step S423.

In step S425, the system control unit 104 controls the image capture apparatus 100 and executes the shooting sequence, and advances the processing 400 to step S426.

In step S426, the system control unit 104 determines whether or not shooting for one frame has been completed. When the system control unit 104 determines that the shooting for one frame has been completed, the system control unit 104 advances the processing 400 to step S427. When the system control unit 104 determines that the shooting for one frame has not been completed, the system control unit 104 advances the processing 400 to step S424.

In step S427, the system control unit 104 determines whether or not the second shutter switch signal SW2 is in ON state. When the system control unit 104 determines that the second shutter switch signal SW2 is in ON state, the system control unit 104 advances the processing 400 to step S423. When the system control unit 104 determines that the second shutter switch signal SW2 is not ON state, the system control unit 104 advances the processing 400 to step S402.

FIGS. 6A and 6B are diagrams illustrating examples of operations at the time of charging the flash in the image capture apparatus 100 according to the first embodiment. FIG. 6A is a diagram illustrating the first charge mode. FIG. 6B is a diagram illustrating the second charge mode.

First, the second charge mode is described with reference to FIG. 6B. When the first shutter switch signal SW1 is turned to ON state, the flash charge unit 231 starts charging operation to the main capacitor 304 in accordance with a control command from the system control unit 104. The system control unit 104 repeats control of the switch 302 to be ON and control of the switch 302 to be OFF for the time period of energization time T1. In this way, charge is accumulated in the main capacitor 304 and gradually comes close to the fully charged voltage by repeating ON and OFF of the switch 302. The system control unit 104 stops the charging operation to the main capacitor 304 when the main capacitor 304 is fully charged. In the second charge mode, the power is supplied from the battery 110 to the first power supply unit 115, and the power is supplied from the first power supply unit 115 to the flash charge unit 231. In other words, in the first charge mode, the charging of the flash charge unit 231 is performed by the power from the battery 110. Further, the energization time T1 is a time set based on a peak current that is acceptable by the flash charge unit 231 and a battery voltage. In the first embodiment, for example, the energization time T1 is set to a time in which the peak current is 2.2 A when the input voltage is 8.4V of the flash charge unit 231. Note that in the second charge mode, components of the image capture apparatus 100 used in the flash charge unit 231 to be described later also operate with the power from the battery 110. The terminal voltage of the battery 110 falls as the power is consumed in each components of the image capture apparatus 100. That is why, since the charge amount to the main capacitor 304 during the energization time T1 is decreased, the time until the main capacitor 304 has been fully charged is lengthened.

Next, the first charge mode is described with reference to FIG. 6A. The operations from ON state of the first shutter switch signal SW1 to the charging of the main capacitor 304 is the same as the operations in FIG. 6B. In the first charge mode, the power form the power supply device 500 is supplied to the flash charge unit 231 via the fourth switch circuitry 111. The power supplied from the power supply device 500 in the first charge mode is equal to or larger than the power used in the flash charge unit 231. As a result, the charge amount that has been charged in the main capacitor 304 in the energization time T1 is not decreased even after the time from the start of charging by the flash charge unit 231 has elapsed. That is why, the time Ta until the main capacitor 304 has been fully charged in the first charge mode is shortened than the time Tb until the main capacitor 304 has been fully charged in the second charge mode.

Figure 7A:
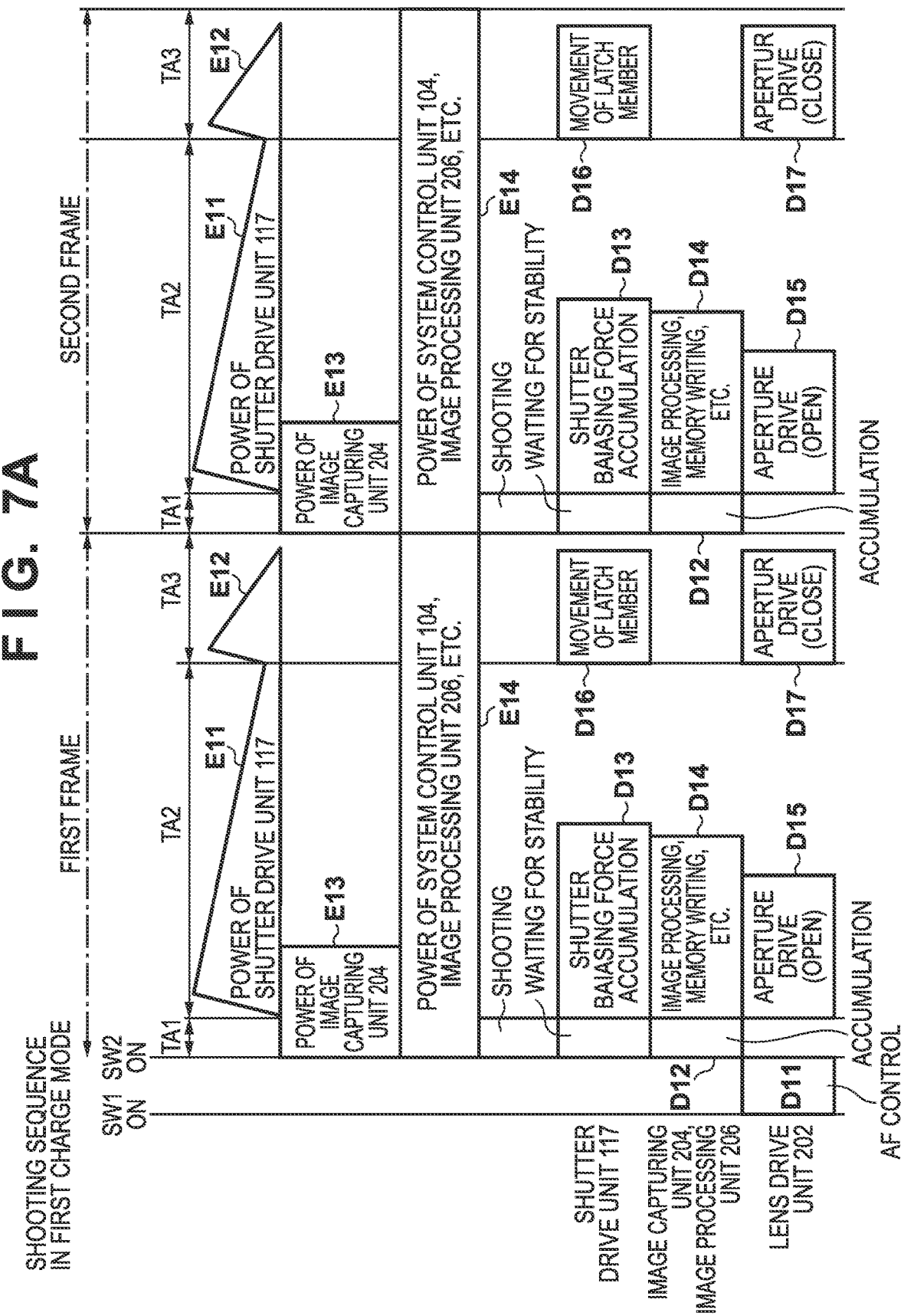
FIGS. 7A and 7B are sequence diagrams illustrating examples of shooting operations in the flash charge mode of the image capture apparatus 100 according to the first embodiment.
Figure 7B:
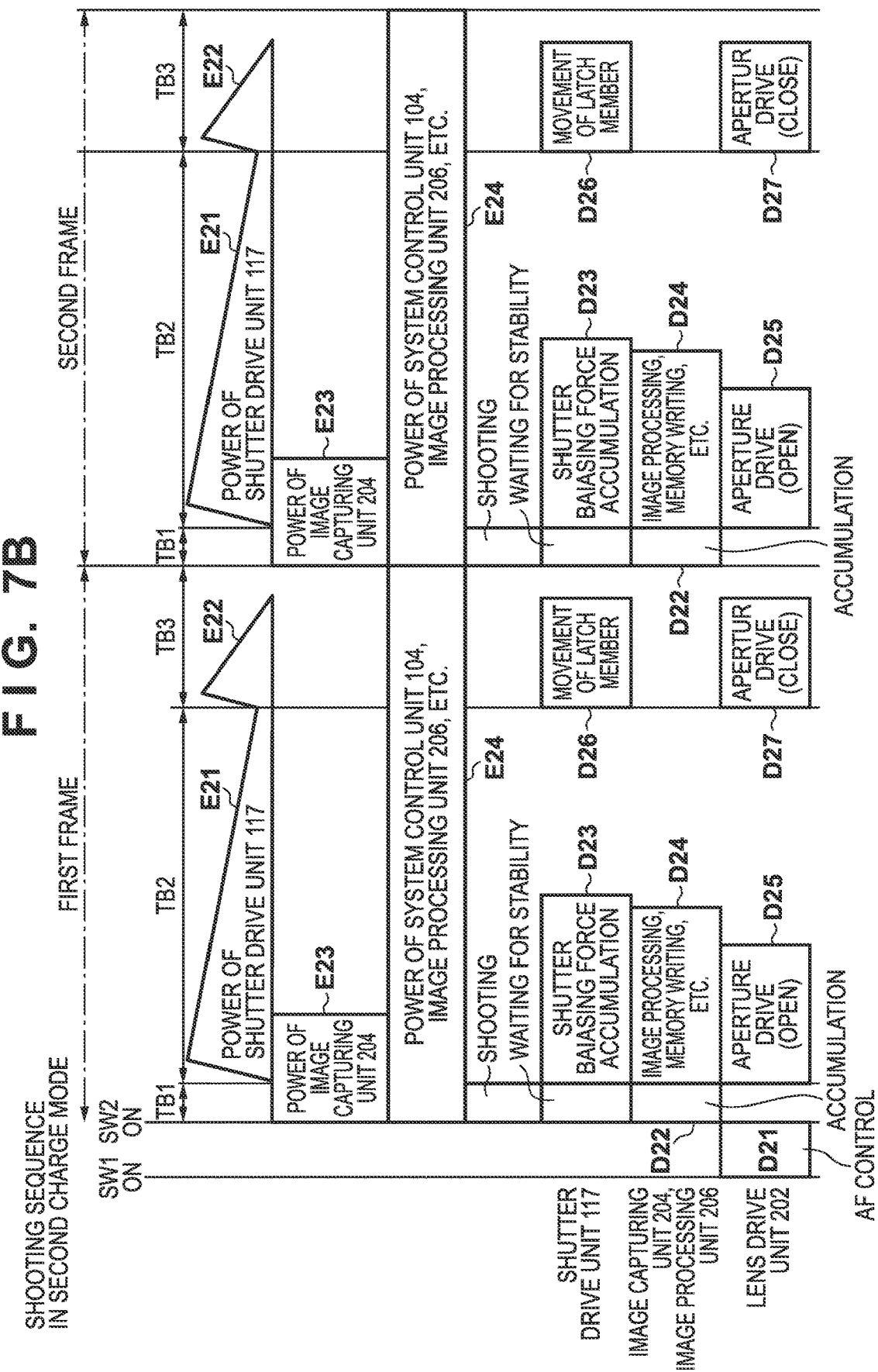

FIGS. 7A and 7B illustrate sequence diagrams indicating a relationship between the operations of the shutter drive unit 117, the image capturing unit 204, the image processing unit 206 and the lens drive unit 202, and the power supply destination and the power supply period in an example of shooting operations in the flash charge mode of the image capture apparatus 100 according to the first embodiment. FIG. 7A is a diagram illustrating the shooting sequence in the first charge mode. The processing of FIG. 7A corresponds to the processing of the shooting sequence in step S417 of FIG. 4. FIG. 7B is a diagram illustrating the shooting sequence in the second charge mode. The processing of FIG. 7B corresponds to the processing of the shooting sequence in step S425 of FIG. 4.

In FIGS. 7A and 7B, the horizontal direction corresponds to the elapsed time in the shooting sequence. Since a large current flows at the start of driving the motor and the current drops as the rotational operation of the motor stabilizes in the power E11, E1 2, E21, and E22 of the shutter drive unit 117, the vertical direction corresponds to the changes in the power amount. In contrast, since the power E13 and E23 of the image capturing unit 204 and the power E14 and E24 of the image processing unit 206, the system control unit 104 and the like are substantially constant, the power amount corresponding to the vertical direction is also indicated to be constant.

First, the shooting sequence (S425) in the second charge mode will be described with reference to FIG. 7B. When it is detected that the first shutter switch signal SW1 is turned to ON state (YES in step S423), the system control unit 104 drives the lens group 201 by the lens drive unit 202 and performs AF control (D21). When it is detected that the second shutter switch signal SW2 is turned to ON state (YES in step S424) while the first shutter switch signal SW1 is in ON state, the system control unit 104 starts the shooting sequence. The system control unit 104 starts the power supply to the image capturing unit 204 (E23). The system control unit 104 also controls the image capturing unit 204 to accumulate the optical image of the subject (D22).

After time TB1 has elapsed from when the second shutter switch signal SW2 was turned to ON state, the energization to the motor of the shutter unit 203 is started by the shutter drive unit 117 and the biasing force of the biasing member of the shutter unit 203 is accumulated (D23, E21). The power for the energization to the motor of the shutter unit 203 by the shutter drive unit 117 is supplied from the battery 110.

In addition, images shot by the image capturing unit 204 are read out, processed by the image processing unit 206, and written in the volatile memory 208 (D24, E24). Furthermore, the driving (open) of the aperture is started by the lens drive unit 202 (D25).

Then, time TB2 has further elapsed, the shutter drive unit 117 starts the energization to the motor of the latch member of the shutter unit 203 and then the latch member moves to the position where the latch member retains the curtain traveling member and is in a stopped state (D26, E22). In addition, the lens drive unit 202 drives (close) the aperture (D27), and the system is in the shooting standby state.

Subsequently, time TB3 has further elapsed, the shutter drive unit 117 stops the energization for the motor of the latch member. In addition, the flash light emission control unit 232 causes the flash to emit flash light, and the retention of the curtain traveling member by the latch member is released and then the shutter curtain is caused to travel, and the shooting by the image capturing unit 204 is performed. The power for charging the main capacitor 304 by the flash charge unit 231 is supplied from the battery 110. The sum of time TB1, TB2 and TB3 is the time (frames/second) required to shoot one frame. The operations in time TB1, TB2 and TB3 are repeatedly executed for shooting of the second and subsequent frames.

Next, the shooting sequence (S417) in the first charge mode will be described with reference to FIG. 7A. When it is detected that the first shutter switch signal SW1 is turned to ON state (YES in step S413), the system control unit 104 drives the lens group 201 by the lens drive unit 202 and performs AF control (D11). When it is detected that the second shutter switch signal SW2 is turned to ON state (YES in step S416) while the first shutter switch signal SW1 is in ON state, the system control unit 104 starts the shooting sequence. The system control unit 104 starts the power supply to the image capturing unit 204 (E13). The system control unit 104 also controls the image capturing unit 204 to accumulate the optical image of the subject (D12).

After time TA1 has elapsed from when the second shutter switch signal SW2 was turned to ON state, the energization to the motor of the shutter unit 203 is started by the shutter drive unit 117 and the biasing force of the biasing member of the shutter unit 203 is accumulated (D13, E11). The power for the energization to the motor of the shutter unit 203 by the shutter drive unit 117 is supplied from the battery 110 and the power supply device 500.

In addition, images shot by the image capturing unit 204 are read out, processed by the image processing unit 206, and written in the volatile memory 208 (D14, E14). Furthermore, the driving (open) of the aperture is started by the lens drive unit 202 (D15).

Then, time TA2 has further elapsed, the shutter drive unit 117 starts the energization to the motor of the latch member of the shutter unit 203 and then the latch member moves to the position where the latch member retains the curtain traveling member and is in a stopped state (D16, E12). In addition, the lens drive unit 202 drives (close) the aperture (D17), and the system is in the shooting standby state.

Subsequently, when time TA3 has further elapsed, the shutter drive unit 117 stops the energization for the motor of the latch member. The vertical direction, the flash light emission control unit 232 causes the flash to emit flash light, and the retention of the curtain traveling member by the latch member is released and then the shutter curtain is caused to travel, and the shooting by the image capturing unit 204 is performed. The power for charging the main capacitor 304 by the flash charge unit 231 is supplied from the power supply device 500. The sum of time TA1, TA2 and TA3 is the time required to shoot one frame. The operations of time TA1, TA2 and TA3 are repeatedly executed for shooting of the second and subsequent frames. In the shooting sequence in the first charge mode, at least time TA2 among time TA1, TA2 and TA3 is a time shorter than time TB2.

Figure 9A:
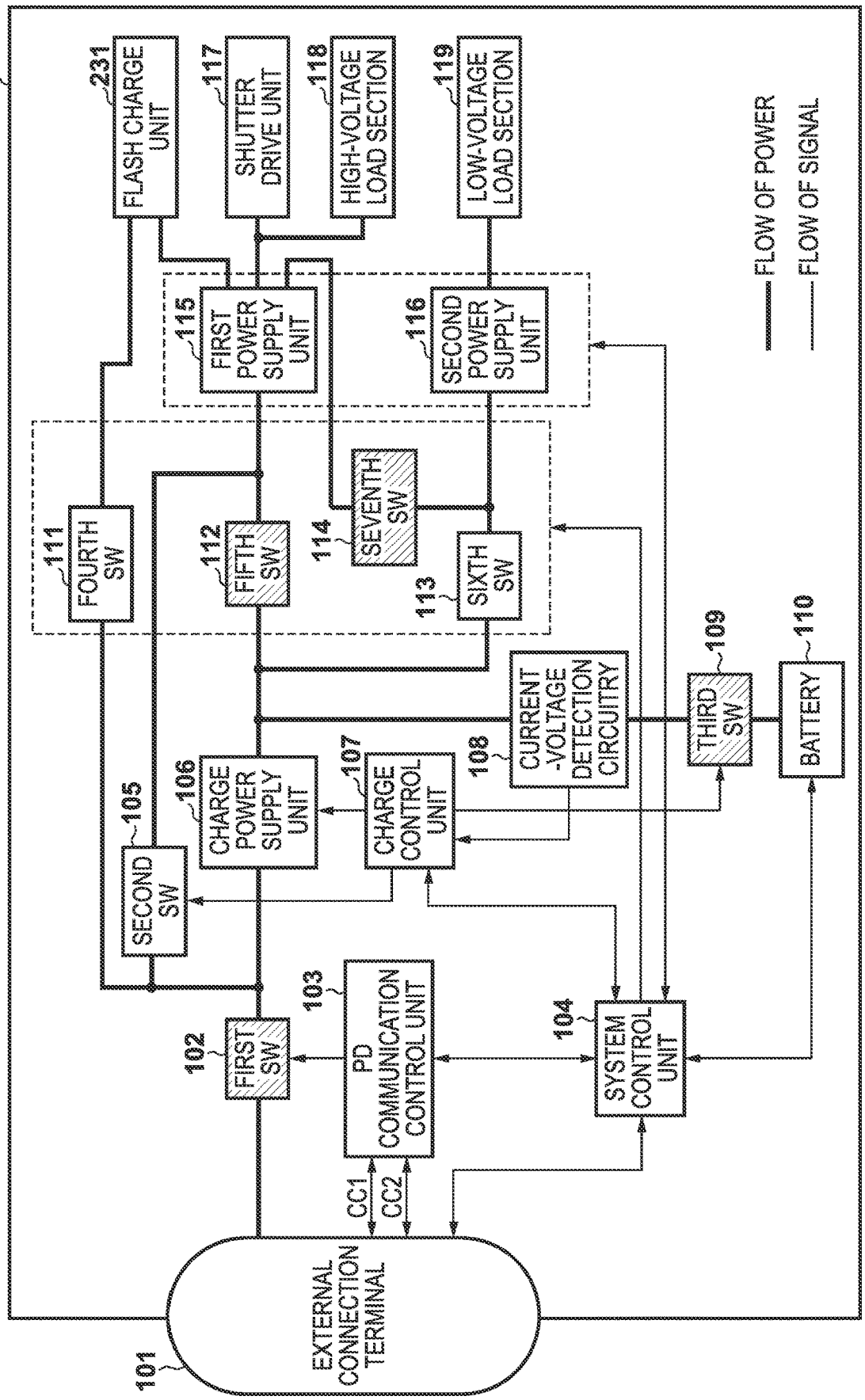
FIGS. 9A to 9C are diagrams illustrating examples of operation states of switch circuitry of the image capture apparatus 100 according to the first embodiment.
Figure 9B:
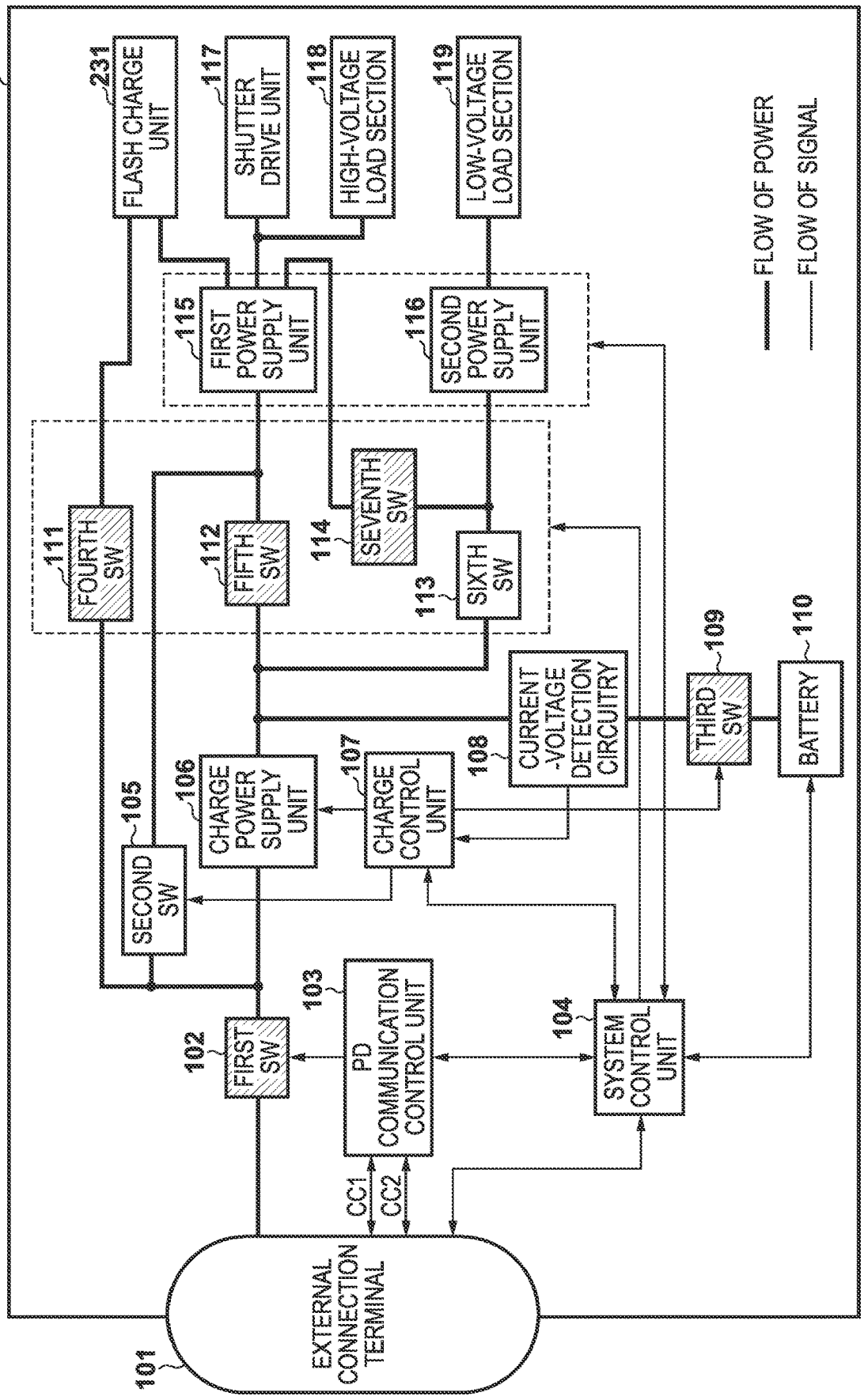
Figure 9C:
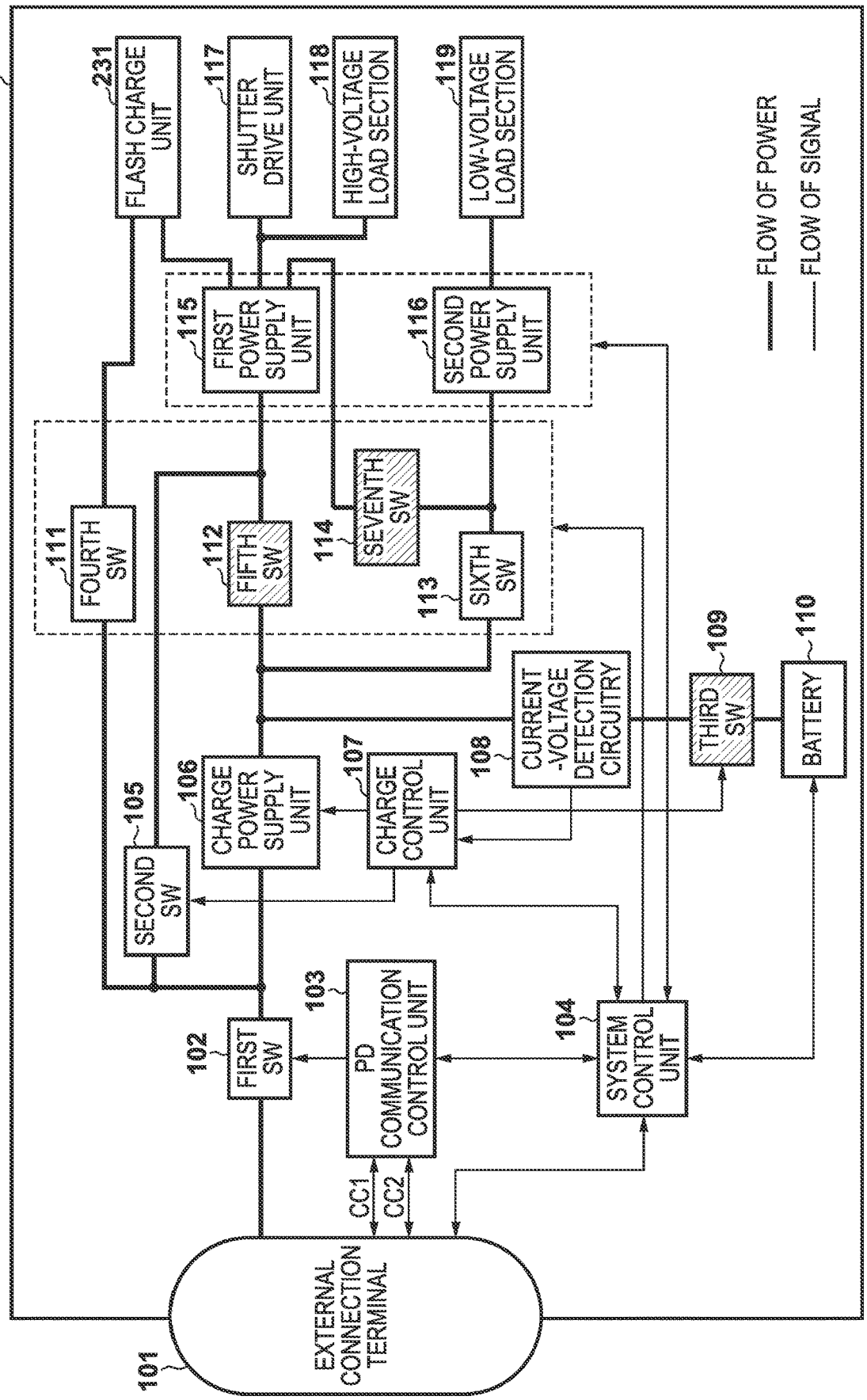

FIGS. 9A to 9C are diagrams illustrating examples of operation states of the switch circuitry of the image capture apparatus 100 according to the first embodiment.

FIGS. 9A to 9C illustrate examples of ON state or OFF state of the switch circuitry in the processing of FIGS. 4A to 4C, the switch circuitry in ON state is illustrated in black and the switch circuitry in OFF state is illustrated in white.

FIG. 9A illustrates an example of the state of the switch circuitry in step S413 of FIG. 4B. The first switch circuitry 102, the third switch circuitry 109, the fifth switch circuitry 112 and the seventh switch circuitry 114 are ON states. The image capture apparatus 100 uses the power supplied from the battery 110 as the power source of the first power supply unit 115 by the power supply path formed by the fifth switch circuitry 112 and the seventh switch circuitry 114. The power from the first power supply unit 115 is supplied to the shutter drive unit 117 and the high-voltage load section 118. In addition, the power from the first power supply unit 115 is supplied to the second power supply unit 116 through the seventh switch circuit 114, and the second power supply unit 116 steps down the voltage from the first power supply unit 115 and the stepped down voltage is supplied to the low-voltage load section 119.

FIG. 9B illustrates an example of the state of the switch circuitry in step S414 of FIG. 4B. The first switch circuitry 102, the third switch circuitry 109, the fourth switch circuitry 111, the fifth switch circuitry 112 and the seventh switch circuitry 114 are ON states. The image capture apparatus 100 uses the power supplied from the battery 110 as the power source of the first power supply unit 115 by the power supply path formed by the third switch circuitry 109, the fifth switch circuitry 112 and the seventh switch circuitry 114. In addition, the image capture apparatus 100 supplies the power supplied from the power supply device 500 to the flash charge unit 231 by the power supply path formed by the first switch circuitry 102 and the fourth switch circuitry 111. As a result, the flash charge unit 231 performs the charging operation with the power from the external device 500. On the other hand, the power from the power supply unit 115 is not supplied to the flash charge unit 231. The power from the first power supply unit 115 is supplied to each load of the image capture apparatus 100 other than the flash charge unit 231.

FIG. 9C illustrates an example of the state of the switch circuitry in step S423 of FIG. 4C. The third switch circuitry 109, the fifth switch circuitry 112 and the seventh switch circuitry 114 are ON states. Since the image capture apparatus 100 does not receive the power from the power supply device 500, the image capture apparatus 100 set the first switch circuitry 102 to be OFF state. And then, the image capture apparatus 100 uses the power form the battery 110 as the power source of the first power supply unit 115 by the power supply path formed by the third switch circuitry 109, the fifth switch circuitry 112 and the seventh switch circuitry 114. In addition, also in the case of the second charge mode, the image capture apparatus 100 uses the power form the battery 110 as the power source of the first power supply unit 115 by the power supply path formed by the third switch circuitry 109, the fifth switch circuitry 112 and the seventh switch circuitry 114 shown in FIG. 9C.

According to the first embodiment, the image capture apparatus 100 can be operated by the power of the battery 110 or the power of the battery 110 and the power from the power supply device 500. In addition, since the power supply device 500 can adjust the output voltage and can supply the output voltage adjusted by the power supply device 500 to the flash charge unit 231, it is possible to charge the main capacitor 304 at high speed. As a result, it is possible to suppress the reduction of the frame speed due to a delay of a flash charging time in the image capture apparatus 100 by using two power sources including the power from the power of the battery 110 and the power of the power supply device 500, and it is possible to contribute to the improvement of the performance of the image capture apparatus 100.

Second Embodiment

At least one of various kinds of functions, processes, or methods described in the foregoing embodiments can also be realized by a personal computer, a microcomputer, a CPU (Central Processing Unit), or a microprocessor executing a program. In the second embodiment, a personal computer, a microcomputer, a CPU, or a microprocessor will be called a "computer X" below. Also, in the second embodiment, a program for controlling the computer X and realizing at least one of various kinds of functions, processes, or methods described in the foregoing embodiments will be called a "program Y".

At least one of various kinds of functions, processes, or methods described in the foregoing embodiments are realized by the computer X executing the program Y. In this case, the program Y is supplied to the computer X via a computer-readable storage medium. The computer-readable storage medium according to the second embodiment includes at least one of a hard disk device, a magnetic storage device, an optical storage device, a magneto-optical storage device, a memory card, a volatile memory, a non-volatile memory, or the like. The computer-readable storage medium according to the second embodiment is a non-transitory storage medium.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-157234, filed Sep. 27, 2021, and Japanese Patent Application No. 2022-130124, filed Aug. 17, 2022, which are hereby incorporated by reference herein in their entirety.

What is claimed is:

1. An image capture apparatus comprising:
a first load;
a second load;
a connector to which an external power supply device is connected;
a CPU; and
a memory storing a program which, when executed by the CPU, causes the CPU to function as the following unit:
a power receiving unit that receives power from the external power supply device connected to the connector; and
a control unit that determines whether power supply capability of the external power supply device is greater than power supply capability of a battery of the image capture apparatus and performs a control such that power from the battery is supplied to the first load and is not supplied to the second load and power from the external power supply device is supplied to the second load and is not supplied to the first load if it is determined that the power supply capability of the external power supply device is greater than the power supply capability of the battery,
wherein the control unit performs a control such that the power from battery is supplied to the first load and the second load if it is determined that the power supply capability of the external power supply device is not greater than the power supply capability of the battery.

2. The image capture apparatus according to claim 1, wherein if it is determined that the power supply capability of the external power supply device is greater than the power supply capability of the battery, the control unit performs a control such that an operating time for which the second load operates with the power from the external power supply device is shorter than an operating time for which the second load operates with the power from the battery.

3. The image capture apparatus according to claim 1, wherein the power receiving unit requests from the external power supply device a voltage higher than a voltage of the battery and receives power from the external power supply device at the voltage higher than the voltage of the battery.

4. The image capture apparatus according to claim 3, wherein the power receiving unit requests from the external power supply device the maximum voltage which the second load can input.

5. The image capture apparatus according to claim 3, wherein the power receiving unit determines the voltage and a current to be requested from the external power supply device according to the second load.

6. The image capture apparatus according to claim 1, wherein
the second load includes circuitry for charging a flash, and
the external power supply device is connected to the connector via a cable.

7. The image capture apparatus according to claim 1, wherein the external power supply device is compliant with Universal Serial Bus (USB) Power Delivery (PD) standard.

8. A method of controlling an image capture apparatus having a first load and a second load, the method comprising:
receiving power from an external power supply device connected to the image capture apparatus;

determining whether power supply capability of the external power supply device is greater than power supply capability of a battery of the image capture apparatus;

controlling such that power from the battery is supplied to the first load and is not supplied to the second load, and power from the external power supply device is supplied to the second load and is not supplied to the first load if it is determined that the power supply capability of the external power supply device is greater than the power supply capability of the battery; and controlling such that the power from the battery is supplied to the first load and the second load if it is determined that the power supply capability of the external power supply device is not greater than the power supply capability of the battery.

9. A non-transitory computer-readable storage medium storing a program which causes an image capture apparatus having a first load, a second load and a power receiving circuitry that receives power from an external power supply device connected to the image capture apparatus and a CPU to execute the following method, the method comprising:

receiving power from the external power supply device connected to the image capture apparatus;

determining whether power supply capability of the external power supply device is greater than power supply capability of a battery of the image capture apparatus;

controlling such that power from the battery is supplied to the first load and is not supplied to the second load, and power from the external power supply device is supplied to the second load and is not supplied to the first load if it is determined that the power supply capability of the external power supply device is greater than the power supply capability of the battery; and controlling such that the power from the battery is supplied to the first load and the second load if it is determined that the power supply capability of the external power supply device is not greater than the power supply capability of the battery.

* * * * *